(12) United States Patent
Kuo et al.

(10) Patent No.: US 8,457,946 B2
(45) Date of Patent: Jun. 4, 2013

(54) RECOGNITION ARCHITECTURE FOR GENERATING ASIAN CHARACTERS

(75) Inventors: Shiun-Zu Kuo, Bellevue, WA (US);
Kevin E. Feige, Duvall, WA (US); Yifan Gong, Sammamish, WA (US); Taro Miwa, Seattle, WA (US); Arun Chitrapu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 11/789,878

(22) Filed: Apr. 26, 2007

(65) Prior Publication Data

US 2008/0270118 A1    Oct. 30, 2008

(51) Int. Cl.
*G06F 17/28*    (2006.01)

(52) U.S. Cl.
USPC ........ 704/2; 704/5; 704/7; 704/231; 704/246; 704/251

(58) Field of Classification Search
USPC ........................ 704/2, 5, 7–10, 231, 246, 251
See application file for complete search history.

(56) References Cited

U.S. PATENT DOCUMENTS

| | | | |
|---|---|---|---|
| 5,220,639 A | 6/1993 | Lee | |
| 5,787,230 A | 7/1998 | Lee | |
| 5,903,861 A | 5/1999 | Chan | |
| 6,018,708 A | 1/2000 | Dahan et al. | |
| 6,067,520 A | 5/2000 | Lee | |
| 6,163,767 A | 12/2000 | Tang et al. | |
| 6,513,005 B1 | 1/2003 | Qin et al. | |
| 6,694,055 B2 | 2/2004 | Wu | |
| 7,085,716 B1 | 8/2006 | Even et al. | |
| 7,139,697 B2 * | 11/2006 | Hakkinen et al. | 704/9 |
| 7,200,555 B1 * | 4/2007 | Ballard et al. | 704/235 |
| 7,467,087 B1 * | 12/2008 | Gillick et al. | 704/260 |
| 2004/0083109 A1 * | 4/2004 | Halonen et al. | 704/277 |
| 2005/0080612 A1 | 4/2005 | Chai et al. | |
| 2005/0203751 A1 * | 9/2005 | Stevens et al. | 704/276 |
| 2005/0216276 A1 | 9/2005 | Tsai et al. | |
| 2005/0231520 A1 * | 10/2005 | Forest | 345/581 |
| 2006/0095264 A1 | 5/2006 | Wu et al. | |

(Continued)

FOREIGN PATENT DOCUMENTS

| | | |
|---|---|---|
| JP | 09-128383 | 5/1997 |
| JP | 2008-090625 | 4/2008 |
| KR | 10-1999-0043026 A | 6/1999 |

OTHER PUBLICATIONS

International Search Report, mailed Aug. 21, 2008, 13 pages.

(Continued)

*Primary Examiner* — Leonard Saint Cyr

(57) ABSTRACT

Architecture for correcting incorrect recognition results in an Asian language speech recognition system. A spelling mode can be launched in response to receiving speech input, the spelling mode for correcting incorrect spelling of the recognition results or generating new words. Correction can be obtained using speech and/or manual selection and entry. The architecture facilitates correction in a single pass, rather than multiples times as in conventional systems. Words corrected using the spelling mode are corrected as a unit and treated as a word. The spelling mode applies to languages of at least the Asian continent, such as Simplified Chinese, Traditional Chinese, and/or other Asian languages such as Japanese.

16 Claims, 29 Drawing Sheets

U.S. PATENT DOCUMENTS

| | | |
|---|---|---|
| 2006/0173685 A1 | 8/2006 | Huang et al. |
| 2006/0271882 A1 | 11/2006 | Lai et al. |
| 2006/0293893 A1 | 12/2006 | Horvitz |
| 2007/0038436 A1* | 2/2007 | Cristo et al. ............... 704/9 |
| 2007/0150106 A1* | 6/2007 | Hashimoto et al. ........... 700/245 |

OTHER PUBLICATIONS

Chung, et al., "Integrating Speech with Keypad Input for Automatic Entry of Spelling and Pronunciation of New Words", Date: Sep. 16-20, 2002, pp. 2061-2064, http://groups.csail.mit.edu/sls/archives/root/publications/2002/keypad-angie.pdf.

Fu, et al., "A Survey on Chinese Speech Recognition", http://coblitz.codeen.org:3125/citeseer.ist.psu.edu/cache/papers/cs/196/ftp:zSzzSzftp.iscs.nus.sgzSzpubzSzcommcolipszSzp96001.pdf/fu96survey.pdf, May 3, 1996.

Gao, et al., "Tangerine: A Large Vocabulary Mandarin Dictation System", http://citeseer.ist.psu.edu/cache/papers/cs/11229/http:zSzzSzknowledge.krdl.org.sgzSzpaperszSzzipzSzghl-95.pdf/gao95tangerine.pdf, May 9-12, 1995.

Zheng, Feng, "A Syllable-Synchronous Network Search Algorithm Forword Decoding In Chinese Speech Recognition", Date: Mar. 15-19, 1999, pp. 601-604, http://sp.cs.tsinghua.edu.cn/~fzheng/PAPERS/1999/9903E_ICASSP_SSS_ZF.pdf.

* cited by examiner

RECOGNITION ARCHITECTURE FOR GENERATING ASIAN CHARACTERS

BACKGROUND

Speech recognition (SR) engines for the English language need spelling wizards mainly because of the inability to include all or substantially all of the proper nouns, particularly names in the engine lexicon. On the other hand, the set of Chinese characters can be considered closed since all the characters are included in the lexicon. There is no need to consider or to worry about out-of-vocabulary characters. However, the major problems in a Chinese SR engine are the homophone sharing across many different characters. There are about 47,000 valid Chinese characters, but there are only about 1,600 different but fixed syllables in the Chinese language. This means that if the syllables are evenly distributed across the different characters, each syllable can correspond to about 23-31 different characters, many of which can mean different things.

Fixed syllables are the set of syllables associated with valid Chinese characters. For example, the syllable "chu" corresponds to characters like 出初處... (/ch uh/ in Pinyin), but there is no "chiu" that corresponds to any valid characters. Because of the limited number of the fixed syllables, there are a significant number of characters that share the same pronunciation. Following is one example of fifty-four characters sharing the same pronunciation as /l ih/; and, the list for /l ih/ is still not comprehensive: 力利立麗例莉歷 俐勵厲曆栗笠粒 茘隸儷吏瀝圠傈戾 樆瀝琍瓅俐癘莅 荔娳卟壢娳卟靋 礪鬲鵹丽俪 溧励历厉麻 悷唎唎嫠唎悷搚...

Consequently, when the engine fails to recognize a word correctly, users can try to correct it from an alternate list, or try to voice the desired word repeatedly for recognition, without success, due to the following problems.

First, if the voice audio is not processed correctly by the acoustic model (AM) or the AM has a lower relevance score for the desired word than other words, while other words have higher language model (LM) scores, then irrespective of how many times the user voices the word, the output may not be the correct word from the alternate list.

Second, assume that the voiced audio is processed correctly by the AM, but if the desired character is in the list entry where the number of alternate items is exceeded and not presented to the user, then users will not be able to obtain the word without typing. This is likely to happen in Chinese, especially when the characters are also homophones of digits or numbers where the SR engine also displays different formats of ITN (Inversed-Text Normalization, such as normalizing "twelve" to "12") results for numbers.

Third, even though there are no out-of-vocabulary characters to consider for the Chinese SR engine, new words can be created by users though the combination of different characters. In addition to the new words, there are no spaces in between words to mark the word boundary. To determine a word boundary, Asian languages (at least related to Simplified Chinese (CHS), Traditional Chinese (CHT), and Japanese (JPN)) require word-breaking in the engine or IME (input method editor) process. Consequently, when a user dictates a proper noun such as a personal name to the Chinese SR engine, which is very likely to be an unknown word, the likelihood is very low that the SR will process the name correctly, unless the name is very common and appears in the training data. Even if the AM and LM are working perfectly, users may still receive an output name with characters such as 劉麗 (the focus being on the second character, where the first character is a family name and the second character is a first name), which is different from the desired output of 劉莉 because of the homophone issue described earlier, i.e., 麗 and 莉 are homophone but are used as first names of different persons. This is also true for human perception during Chinese conversation as well, where a first person tells a second person his name, and the second person will need to ask the first person exactly which characters are used in the name.

Lastly, when users try to correct characters in a word during the SR process, it may be possible to obtain the correct output by selecting the character(s) and/or voicing the character(s) repeatedly to determine if the correct character will eventually appear on the alternate list. Oftentimes, when the characters do not have many homophones, it is possible to obtain the correct word for replacement. However, this kind of correction will be done on the basis of individual characters. The correction will not be picked up in the SR because SR learns by the word, not by single characters. Consequently, if the user wants this character several times in a document, the user will need to repeat the correction process each time the character is spoken. Thus, conventional recognition processes are cumbersome and inefficient.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a spelling mode for Asian speech recognition algorithms. This facilitates the determination of a boundary of a new word and adding the new word into the lexicon. Consequently, based on the spelling mode, a word correction occurs only once, unlike conventional systems where word correction occurs multiples times.

Specifically, in the context of Chinese characters, the spelling mode facilitates the input of Chinese characters when the speech recognition engine returns incorrect characters in dictation. Words corrected using the spelling mode are corrected as a unit and treated as a word. This is because unlike English words, for example, where the word boundary is easily recognizable, the boundary in Asian languages is not clear. Thus, the input of Chinese characters (in this example) by going through a spelling mode reduces or eliminates misrecognition of the word in subsequent recognition processing.

The disclosed spelling mode applies to Simplified Chinese, Traditional Chinese, and/or other Asian languages such as Japanese, where characters have corresponding fixed sounds.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
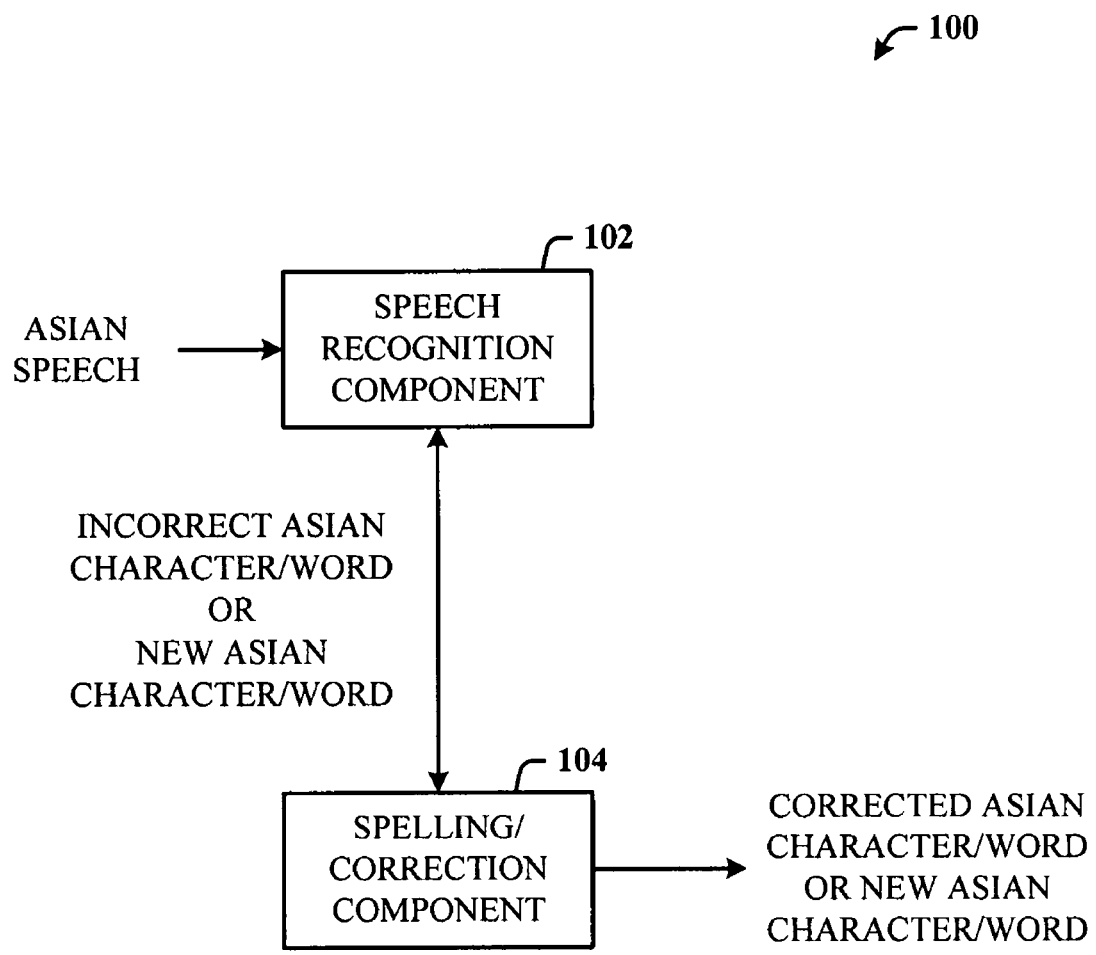
FIG. 1 illustrates a computer-implemented translation system.

Disclosed herein is architecture that provides algorithms, data, and at least a user interface (UI) that includes a spelling mode for Asian speech recognition and obtaining new words/characters or correction of misrecognized characters.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented translation system 100. The system 100 includes a speech recognition component 102 that receives Asian voice or speech input, and performs recognition processing on the input. In some cases, the recognition process will output incorrect Asian characters and/or words. Accordingly, the system 100 further includes a correction component 104 for generating a correct character and/or word based on output of an incorrect Asian character/word and/or a new Asian character/word by the speech recognition component.

The system 100 will be described in greater detail in at least the context of a UI for user interaction, a split spelling panel UI for retrieving English and Asian words, and also for providing and executing different commands to launch and interact with the UI panels, and a user spelling mode for capturing new words and determining word boundaries. The system 100 also assists the user in obtaining characters by voice input using pronunciation, words containing desired characters, subcomponents of desired characters, and selection through the homophone list, and then selects the desired character from the converted candidates. Datastores are provided that contain the data that stores the phonetic distance information of the phonemes in the phonetic system, and in a confusion matrix table. This information helps a user correct a misrecognized pronunciation quickly and easily, thereby reducing the likelihood that the system will make the same mistakes.

A datastore is provided that contains the data that contains usage frequency of each character and also the possible categories in which a character can exist such as personal names, company names, etc. Thus, when a key word is detected, the corresponding category will be triggered and the characters used for that category will be pushed higher in the list. Reading key characters in a word and re-adjusting the character list so that the desired character will show up in the top of the list for the remaining correction is also part of the methods disclosed herein.

The system 100 facilitates obtaining characters by voice-input using words that contain the desired character, and also obtaining characters by examining the sub-component of the character. The UI of the system 100 processes homophone commands in order to obtain correct words and to avoid re-entering a pronunciation. Users can also share a lexicon of new words and send back new words for evaluation and updating a different lexicon. Moreover, other Asian speech inputs (e.g., Japanese) can switch among many (e.g., four) different writing systems.

Figure 2:
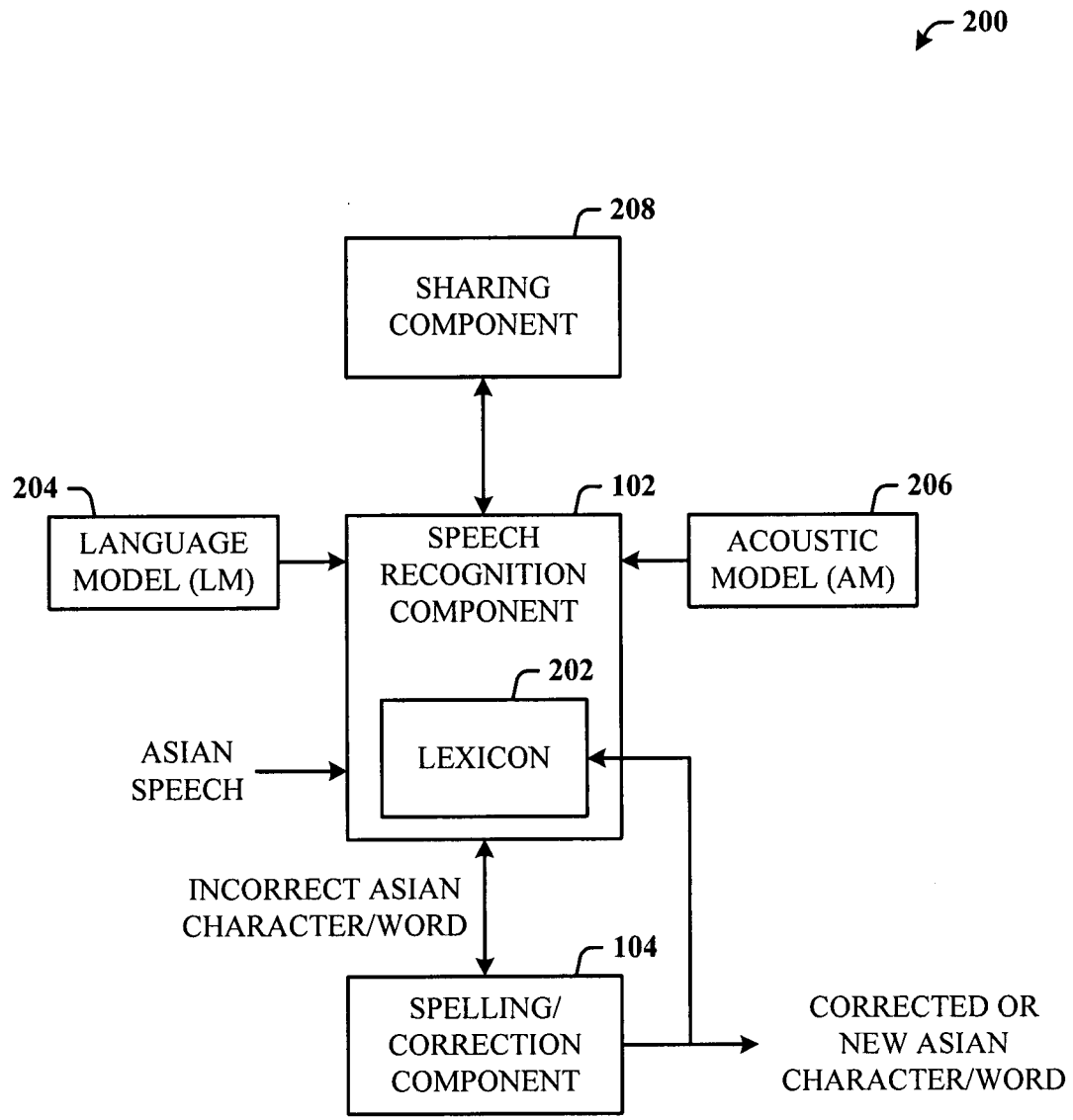
FIG. 2 illustrates a system that facilitates lexicon sharing based on new words learned during spelling/correction processes.

FIG. 2 illustrates a system 200 that facilitates lexicon sharing based on new words learned during correction processes. The system 200 includes the speech recognition component 102 and spelling/correction component 104 of FIG. 1. However, the output of the correction component 104 feeds back to the recognition component 102 to update an internal lexicon 202. Note, however, that the lexicon 202 can be external to the recognition component 102.

The system 200 can also include a language model (LM) 204 and an acoustic model (AM) 206, as in conventional recognition systems. The LM 204 (or grammar file) contains a set of probabilities of word sequences. The AM 206 characterizes acoustic behavior of words in the form of phonemes based on voice data and transcriptions thereof. The AM 206 models the sound units of language based on feature vectors generated from the speech audio signal. The recognition component 102 processes input received from the LM 204 and AM 206 to provide the best output. However, as indicated, in complex applications such as Asian language recognition processing, providing a correct result and then resolving an incorrect result can be a challenge. Thus, when the corrected result is reached, it is beneficial to update (or improve) the lexicon 202. These updates can be important in such complex applications. Accordingly, with appropriate security checks in place, a sharing component 208 facilitates the sharing of information, such as the lexicon 202, with other users or systems and/or the lexicon vendor for distributing a new lexicon corpus. This will be described in greater detail herein.

Figure 3:
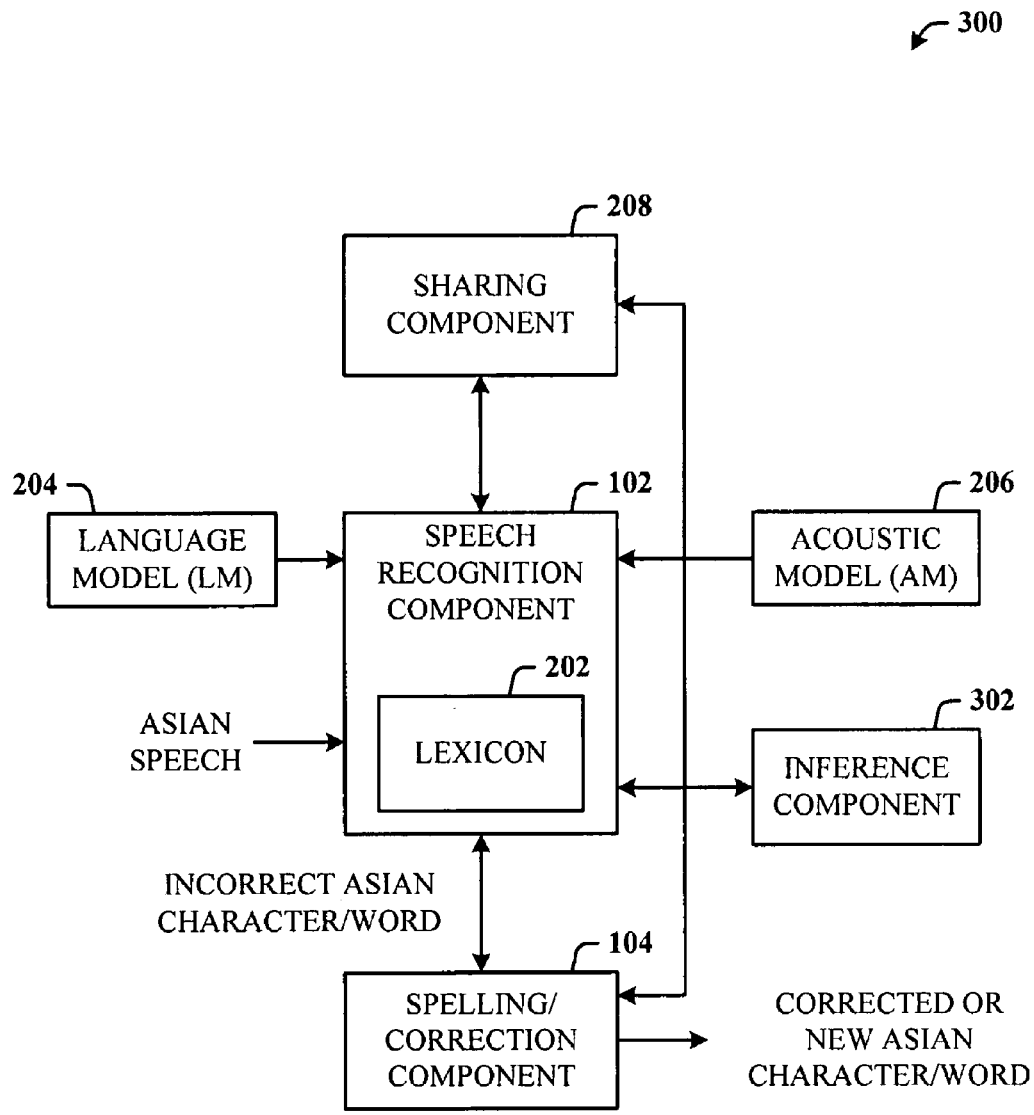
FIG. 3 illustrates a system that employs an inference component which facilitates automating one or more functions.

FIG. 3 illustrates a system 300 that employs an inference component 302 which facilitates automating one or more functions. For example, inferences can be made based not only the user (e.g., user profiles) but also on speech and correction activities that the component 302 learns and reason about. Consider that the user is far more proficient at English rather than Chinese and that over time, the inference component 302 learns that the user typically has speech recognition errors associated with certain Chinese characters. Accordingly, the component 302 can automate functions of the UI in anticipation of the user making the same errors by presenting the spelling mode interface versus the pronunciation interface to more efficiently assist the user.

In another example, it can be learned that the user generally prefers to use spelling mode over any other mode provided. Thus, when confronted with selection of a method to make the correct, the component 302 will automatically present the spelling mode UI. These are just a few examples of the many inferences that can be made based upon learning and reasoning not only about user interactions, but also system processes that tend to occur repeatedly based on certain input criteria.

The inference component 302 can employ machine learning and reasoning (MLR), for example, for monitoring, analyzing, computing, and employing learned and reasoned results The subject architecture (e.g., in connection with selection) can employ various MLR-based schemes for carrying out various aspects thereof. For example, a process for determining what character or character in a word to select and present can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence (class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

The inference component 302 can interface to the recognition component 102, correction component 104, lexicon 202, LM 204 (connection not shown), AM 206 and sharing component 208, to monitor user and system processes and obtain data, for example. The use of the inference component 302 in system 300 is just one example of the many different ways in which inferencing can be employed and connected. In other words, the inference component 302 can be employed with the more detailed illustrations of system components in later figures.

Figure 4:
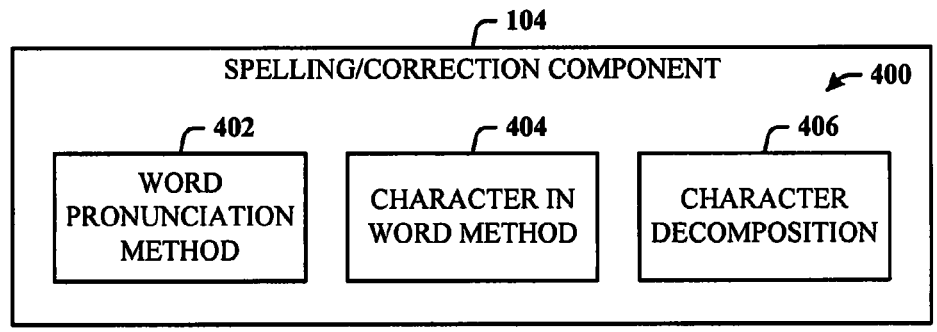
FIG. 4 illustrates one or more methods that can be employed by the spelling/correction architecture disclosed herein.

FIG. 4 illustrates one or more methods 400 that can be employed by the correction architecture disclosed herein. For example, the spelling/correction component 104 can include a word pronunciation method 402, a character-in-word method 404, and a character decomposition method 406. These methods 400 provide at least three ways of specifying a character. Ways in which a character can be specified include giving information on how the word is pronounced with local phonetic symbols (e.g., the pronunciation method 402). The character-in-word method 404 includes giving information on how the character is written by giving the words in which the character exists. For example, if the user chooses to specify 薰, the user can say "薰陶的薰". This is analogous to use of "a, as in apple" in the English language.

Giving information on how the character is composed (or that can be decomposed) is provided by the decomposition method 406. In other words, the user can voice the constituent parts of the character. For example, if the user wants to specify 李, the user can say "木子;李". All three methods (402, 404, and 406) are described in greater detail herein.

The first method, the pronunciation method 402, can be provided using a spelling wizard, while methods 404 and 406 can be directly applied without the wizard. However, it is to be understood that all methods (402, 404 and 406) can be implemented using the wizard so that users can choose one of the methods for word correction. It is also to be understood that use of the term "wizard" is not to be construed as limiting in any way. In other words, a series of dialogs can be presented which concentrate on a small portion of the overall process, rather than what could normally be considered by a wizard as leading the user through a process.

The pronunciation method 402 is used when users try to type in Chinese characters or words. The use of pronunciations for Asian characters is common in some Asian countries. There are other input methods that can be used, however, rather than pronunciation in the Traditional Chinese OS. Given the convenience provided by pronunciation many users will use pronunciation (注音) when typing characters with a keyboard. This is even more the case for users in China when using Simplified Chinese OS, where Pinyin, the local pronunciation system is used to type characters with the keyboard. Taiwanese users (using Traditional Chinese) will type in ㄒㄩㄣ and spacebar for a first audio tone to get a list of words that use this pronunciation, for example, 勳薰勛... and select one of the words, for example, the second word 薰.. In contrast, users in China can type in "xun" and receive a list of words such as 勳薰勛... and select one of the words, for example, the second word 薰.

However, typing takes time and can be error prone. This is particularly time and labor consuming for Taiwanese users because the phonetic system for Traditional Chinese is different from the set of twenty-six letters (for Pinyin) used in the mainland Chinese language. For example, the phonetic symbols look like ㄅㄆㄇㄈ, and the first symbol ㄅ can be considered as a /b/ sound, but is given by the key for 1 (numeral) and ! (exclamation point), instead of keyboard key for the letter b. Thus, users need to learn where each symbol is located on the keyboard. On the other hand, Pinyin, used in mainland China, is composed of twenty-six English letters, which does not require learning another keyboard set if users are familiar with the location of the twenty-six English letters on the keyboard.

The spelling wizard overcomes this limitation by allowing the user to obtain Chinese words by voice, rather than typing. This is particularly useful where users are not familiar with the location of the phonetic symbols and/or the twenty-six English letters on the keyboard, or do not interact frequently with the symbols to select and enter the symbols quickly.

The second (or character-in-word) method 404 can be more complicated than the word pronunciation method 402 because the chosen word that contains the character can be any word, even names from famous people. The disclosed architecture will contain all the characters used in the Chinese language, but may not contain all the words, especially the names of most recently famous people that are not yet part of the training data.

Users can choose a word that contains the desired character, but the character may not be the first character in the word. The character can appear in the middle or at the end of the word. For example, the user may speak "薰陶的陶" to get the last (or bolded) character 陶.

In order to obtain good recognition accuracy, it is desirable to have a good sense of what type of words people use to specify characters and either assigning a higher weighting to those words or specially training the words. The proper collection and arrangement of the data helps to boost the SR accuracy. Additionally, the better the AM of the SR, the better the results from this method. Once these are accomplished, employing this method 404 to correct misrecognized Chinese words can be easier than the first method 402 because the number of steps to obtain the correct character is fewer than providing pronunciation.

The third method 406 can be used to a lesser extent for the few easily decomposed words. In other words, there are not a significant number of words that can be easily decomposed, and which are widely used by people. Therefore, the decomposable words can be listed in the grammar (or LM) to support this method 406.

Figure 5:
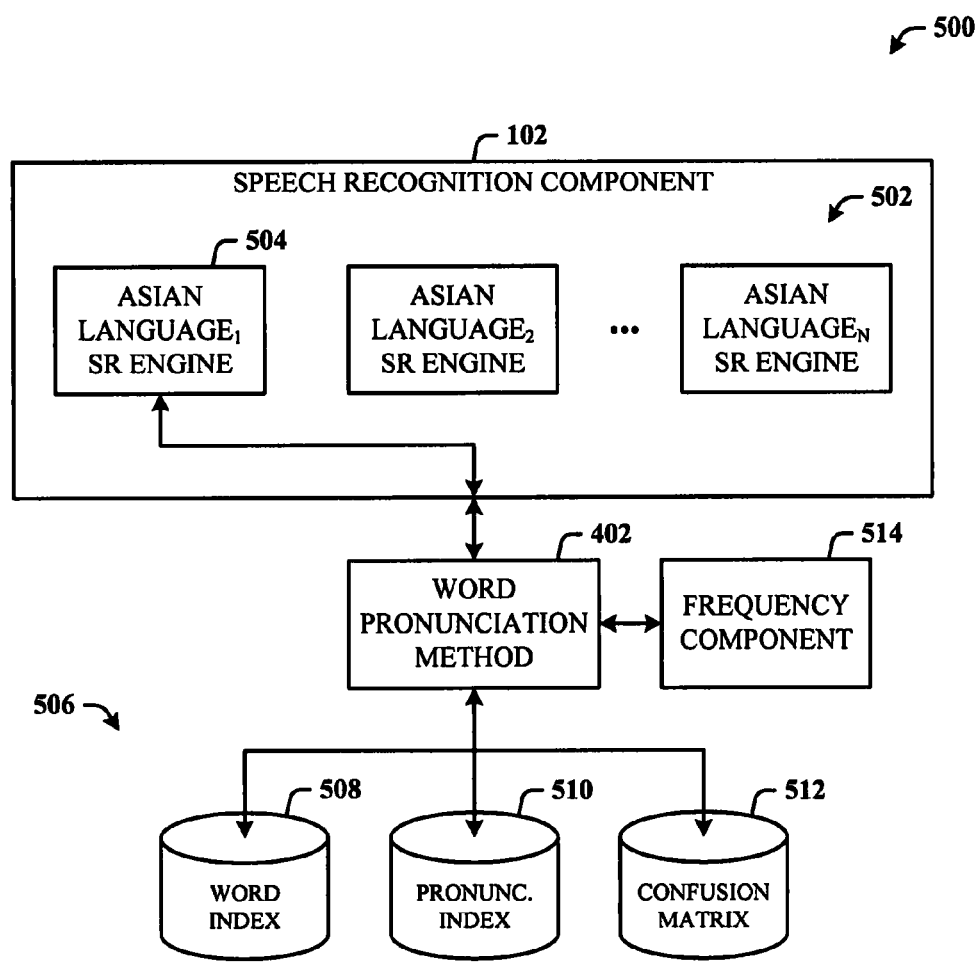
FIG. 5 illustrates a system that employs word pronunciation as the character specification method.

FIG. 5 illustrates a system 500 that employs word pronunciation as the character specification method. As indicated previously, a spelling wizard can be employed for the pronunciation method. In support of users providing pronunciation and choosing the correct characters, the wizard employs one or more data files that map between characters and the pronunciation. Additionally, an optimized list of homophone words is provided so that users can obtain the desired characters quickly.

The following describes the data files for conversion between phonetic systems and characters. In this first example, a phonetic system is described in CHS/CHT, along with an overview of exemplary data files.

As described before, CHS uses Pinyin, which also uses the twenty-six letters of the English language, but with optional tonal information. In contrast, CHT use Zhuyin, which are pictographic symbols, but not regular Chinese. Zhuyin for CHT is analogous to the international phonetic alphabet (IPA) for English. For instance, for the character 田, the phonetic representations for CHS and CHT are given below:

CHS: tian
CHT: ㄊㄧㄢˊ

The recognition component 102 of FIG. 5 shows a plurality 502 of Asian language engines (denoted ASIAN LANGUAGE₁ SR ENGINE, . . . , ASIAN LANGUAGE_N SR ENGINE, where N is a positive integer). A first engine 504 of the engines 502 uses the word pronunciation method 402, which further uses three data files 506 for providing data. Each language engine 502 uses the three data files 506 for the process of converting pronunciation to characters. A first data file 508 stores words as an index and the related information of each word as a value that includes pronunciation, tone, usage frequency, and/or a possible category. A second data file 510 stores the pronunciation as an index and all the words with that pronunciation as a value, and in an order based on a frequency of usage. A third data file 512 is used to store confusion matrix information among phonemes for users to correct misrecognized phonemes efficiently.

As indicated, the first data file 508 stores the information of characters and character pronunciation, tone, frequency, and/or possible category. For example,

| CHS: | |
|---|---|
| 好 | hao_3_1_z; hao_4_1_z |
| 田 | tian_2_1_n |
| ... | |
| CHT: | |
| 好 | ㄏㄠ_3_1_z; ㄏㄠ_4_1_z |
| 田 | ㄊㄧㄢ_2_1_n |

For characters that have a different pronunciation in different words, such as 好 (this character is used as a 3$^{rd}$ tone in "很好" (meaning 'very good'); but as a 4$^{th}$ tone in "喜好" (meaning 'favorite'), the possible pronunciations are recorded in one line, with elements separated by a semi-colon (;).

According to recent information, there are about 47,035 valid Chinese characters, a large number of which are rarely-used and have been accumulated throughout history. Only about 2,000 characters are actively used by literate people in China. Consequently, characters that fall into the 2,000 actively-used character set can be displayed first. In order to know if characters in the actively-used set should be displayed on or near the top of the list presented to the user, actively-used characters are marked as "1", the others, as "2". Characters that show up in a particular category, such as personal names, can be given a category code, for example, "n", for personal names.

The system 500 can also include a frequency component 514 for tracking the frequency of usage of a character and/or word, as stored in the second data file 510. This second data file 510 stores pronunciation and the characters associated with that pronunciation in order of frequency of appearing in different words, and also the frequency of the words or characters. The first data file 508 stores whether a word falls into the 2,000 actively-used characters. This second data file 510 orders the characters according to one or both of the overall active/inactive frequency and according to the frequency of usage related to other homophone characters. The frequency information can be obtained from existing training data. The order in the second data file 510 can be adjusted based on learning and reasoning about user selections. The second data file 510 can be generated from the first data file 508 if more specific frequency information can be specified in the first data file 508. However, the second data file 510 should be generated and saved in a user profile folder so that the second file 510 can be used to save the adjusted order after learning from user selection. The following listing indicates pronunciation and word frequency. Underlined words are those that are rarely used.

```
CHS hao_1       富俟嗃獔仧
hao_2       豪毫貉号嗥鲶壕濠郝鄗薧劼...
hao_3       好郝怓
hao_4       号洰耗给镐好灏颢薧昊傶皓...
tian_1      天添俱天...
tian_2      田填恬甜湉畑沺...
tian_3      殄忝靦畉舔倎...
tian_4      瑱掭㲆

CHT

ㄏㄠ_1       富俟嗃獔仧
ㄏㄠ_2       豪毫貉号嗥鲶壕濠郝鄗薧劼...
ㄏㄠ_3       好郝怓
ㄏㄠ_4       号洰耗给镐好灏颢薧昊傶皓...
ㄊㄧㄢ_1     天添俱天...
ㄊㄧㄢ_2     田填恬甜湉畑沺...
ㄊㄧㄢ_3     殄忝靦畉舔倎...
ㄊㄧㄢ_4     瑱掭㲆
```

A context-free grammar (CFG) can be provided for storing valid syllables. For CHS, users are able to voice "T I A N" to obtain "tian" in the CHS phonetic system, and then convert this into a list of characters that use this pronunciation. The CFG includes another option that allows users to say "T I A N" to receive "tian" before converting to the characters. This method groups some of the diphthongs, or diphthongs plus ending nasals, as given by,

```
<?xml version="1.0" encoding="utf-16"?>
<grammar xml:lang="zh-TW" version="1.0"
xmlns="http://www.w3.org/2001/06/grammar"
xmlns:sapi="http://schemas.microsoft.com/Speech/2002/06/
SRGSExtensions
" root="Greeting" tag-format="semantics-ms/1.0">
    <rule id="Greeting" scope="public">
        <one-of>
            <item><token sapi:pron="b o_ h o_ h a_ ha_ h ">b a</token></item>
            <item><token sapi:pron="b o_ h o_ h a_ h eh_ h ">b ai</token></item>
            <item><token sapi:pron="b o_ h o_ h aa_ h ng_ h ">b ang</token></item>
            ...
        </one-of>
        <one-of>
            <item><token sapi:pron="bi i_ h i_ h ge eh_ h i_ h ">b a</token></item>
            <item><token sapi:pron="bi i_ h i_ h ge eh_ h i_ h ga a_ h eh_ h ">b a i</token></item>
            <item><token sapi:pron="bi i_ h i_ h ge eh_ h i_ h ge el_ h nn_ h ji i_ h i_ h ">b a n g</token></item>
            ...
        </one-of>
```

For CHT, only phonemes in Zhuyin are used in the grammar. The pronunciation used in the engine will also be provided in the grammar to increase SR accuracy.

```
<?xml version="1.0" encoding="utf-16"?>
<grammar xml:lang="zh-TW" version="1.0"
xmlns="http://www.w3.org/2001/06/grammar"
xmlns:sapi="http://schemas.microsoft.com/Speech/2002/06/
SRGSExtensions
" root="Greeting" tag-format="semantics-ms/1.0">
    <rule id="Greeting" scope="public">
        <one-of>
            <item><token sapi:pron="b o_ h o_ h a_ ha_ h ">ㄅㄚ</token></item>
            <item><token sapi:pron="b o_ h o_ h a_ h eh_ h ">ㄅㄞ</token></item>
            <item><token sapi:pron="b o_ h o_ h aa_ h ng_ h ">ㄅㄤ</token></item>
            ...
```

If pronunciation is recognized incorrectly, the wizard allows a user to correct the pronunciation. After selecting the phoneme to correct, the wizard shows a list of phonemes that are close to the misrecognized phoneme, and the list can be ordered according to the distance between the two phonemes, depending on the place of articulation, manner of articulation, voicing, context, and the impact of other local dialect for example.

Many people in Taiwan speak both Mandarin and Southern Min. The sound structure from the Southern Min dialect influences the Mandarin dialect greatly, in several ways. Most people cannot distinguish ㄓㄔㄕㄖ (retroflex consonants) from ㄗㄘㄙ (alveolar consonants), and some people cannot distinguish ㄈ (labial-dental fricative) from ㄏ (velar fricative). For some dialects in southern China, /n/ and /l/ are not distinguishable and also influence the production of other learned languages. The distance between the set of minimally distinguishable phonemes is given a shorter distance.

Context refers to whether the two phonemes appear in the same context. For example, ㄅ (/b/) and ㄆ (/p$^h$/) are closer in terms of context than ㄅ (/b/) and ㄈ (/f/), because phonemes can be followed by the same nuclear vowel(s) and coda consonant(s).

| | | | | | |
|---|---|---|---|---|---|
| ㄅㄚ | ba | ㄆㄚ | pa | ㄈㄚ | fa |
| ㄅㄞ | bai | ㄆㄞ | pai | | |
| ㄅㄢ | ban | ㄆㄢ | pan | ㄈㄢ | fan |
| ㄅㄤ | bang | ㄆㄤ | pang | ㄈㄤ | fang |
| ㄅㄠ | bao | ㄆㄠ | pao | | |
| ㄅㄟ | bei | ㄆㄟ | pei | ㄈㄟ | fei |
| ㄅㄣ | ben | ㄆㄣ | pen | ㄈㄣ | fen |
| ㄅㄥ | beng | ㄆㄥ | peng | ㄈㄥ | feng |
| ㄅㄧ | bi | ㄆㄧ | pi | | |
| ㄅㄧㄢ | bian | ㄆㄧㄢ | pian | | |
| ㄅㄧㄠ | biao | ㄆㄧㄠ | piao | | |
| ㄅㄧㄝ | bie | ㄆㄧㄝ | pie | | |
| ㄅㄧㄣ | bin | ㄆㄧㄣ | pin | | |
| ㄅㄧㄥ | bing | ㄆㄧㄥ | ping | | |
| ㄅㄛ | bo | ㄆㄛ | po | ㄈㄛ | fo |
| ㄅㄨ | bu | ㄆㄨ | pu | ㄈㄨ | fu |
| | | | | ㄈㄡ | fou |

An exemplary confusion matrix table based on these features for consonants used in CHT is given as below. The following table is obtained by computing the distances based on the place of articulation, manner of articulation, voicing, context, and the impact of other local dialects. This type of confusion matrix can also be generated by automatically comparing the AM of different phones, which will cover the place of articulation, manner of articulation, voicing. The confusion matrix can also be obtained by the AM of different phones, and adjusted based on the impact of the context and other dialects, for the final form. The same methods can be used to generate a matrix for vowels and tones for CHT, and consonants and vowels for all other Asian languages.

the English letter can be returned directly to text; but when spelling using Chinese, the phonetic symbols are output and then converted into Chinese. Thus, the process for the two spelling modes is different. Some of the English letters and the Chinese phonetic symbols are homophones. Thus, splitting the two processes avoids the confusion. Moreover, the CFG activated can be much simpler if splitting the process. Additionally, the recognition accuracy will be higher. Splitting the two commands benefits CHS the most, because the phonetic symbols in CHS are also the same twenty-six English letters. If splitting is not performed, the time for converting into Chinese characters will be unknown. Moreover, more strict checks on the valid phonetic sequence may not be performed if the users intend to use Pinyin for Chinese.

Figure 6:
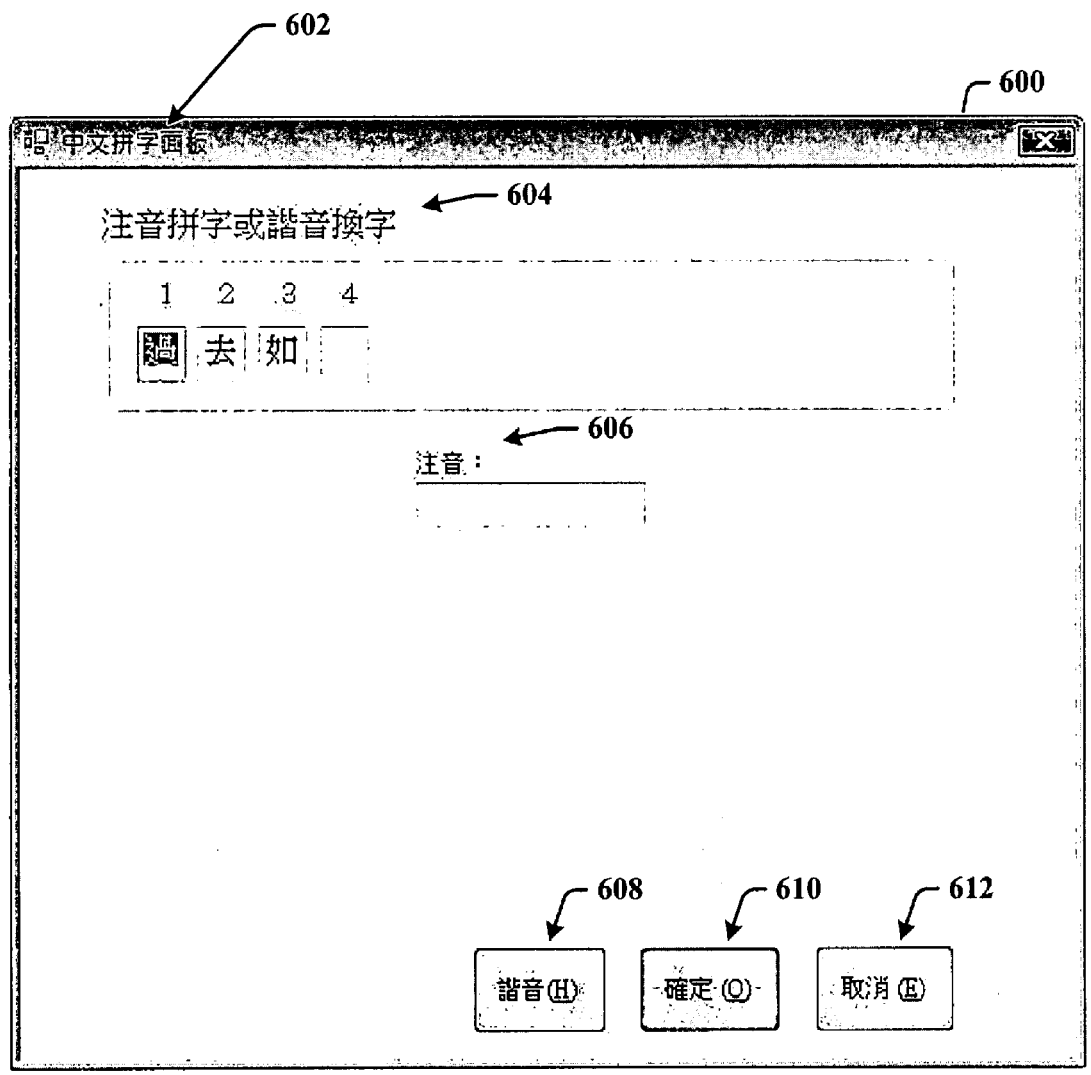
FIG. 6 illustrates a screenshot of a spelling dialog panel presented when the user desires Asian characters/words as output.
Figure 7:
FIG. 7 illustrates a screenshot of a spelling dialog dialog panel presented when the user desires English words as output.

The following describes a series of spelling mode panels (or screenshots) that are triggered and presented when a user voices commands. FIG. 6 illustrates a screenshot of a spelling dialog panel 600 presented when the user desires Asian characters/words as output. When the user voices "中文拼字" ("spelling for Chinese characters/words") the spelling mode panel 600 is presented and includes title bar 602 indicating that the panel 600 is a Chinese Spelling panel, using the pronunciation to obtain a character or homophone command to change a character 604, a pronunciation 606, and dialog selectors in Chinese: a Homophone (H) selector 608, an OK (O) selector 610, and a Cancel (E) selector 612. When the user speaks "英文拼字" ("spelling for English words"), FIG. 7 illustrates a screenshot of a spelling mode dialog panel 700 that is presented when the user desires English words as output. The panel 700 illustrates "Spelling Panel" 702 in Chinese, the Chinese instruction 704 to "Spell words clearly" (or annunciate clearly), the Chinese instruction 706 to "Spell it again", and one or more selectors marked in Chinese: an OK selector 708 and a Cancel selector 710. The panel 700 also

| | ㄅ | ㄆ | ㄇ | ㄈ | ㄉ | ㄊ | ㄋ | ㄌ | ㄍ | ㄎ | ㄏ | ㄐ | ㄑ | ㄒ | ㄓ | ㄔ | ㄕ | ㄖ | ㄗ | ㄘ | ㄙ |
|---|---|---|---|---|---|---|---|---|---|---|---|---|---|---|---|---|---|---|---|---|---|
| ㄅ | | 2 | 4 | 3 | 2 | 3 | 6 | 7 | 3 | 4 | 7 | 5 | 6 | 5 | 6 | 7 | 6 | 5 | 4 | 5 | 4 |
| ㄆ | | | 4 | 1 | 4 | 3 | 6 | 7 | 5 | 4 | 5 | 5 | 4 | 3 | 6 | 5 | 4 | 5 | 4 | 3 | 2 |
| ㄇ | | | | 5 | 6 | 7 | 2 | 3 | 7 | 8 | 9 | 5 | 6 | 7 | 6 | 7 | 8 | 7 | 4 | 5 | 6 |
| ㄈ | | | | | 3 | 2 | 5 | 6 | 4 | 3 | 4 | 4 | 3 | 2 | 5 | 4 | 3 | 4 | 3 | 2 | 1 |
| ㄉ | | | | | | 1 | 4 | 5 | 1 | 2 | 5 | 3 | 4 | 3 | 4 | 5 | 4 | 3 | 2 | 3 | 2 |
| ㄊ | | | | | | | 5 | 6 | 2 | 1 | 4 | 4 | 3 | 2 | 5 | 4 | 3 | 4 | 3 | 2 | 1 |
| ㄋ | | | | | | | | 1 | 5 | 6 | 7 | 3 | 4 | 5 | 4 | 5 | 6 | 5 | 2 | 3 | 4 |
| ㄌ | | | | | | | | | 6 | 7 | 8 | 4 | 5 | 6 | 5 | 6 | 7 | 6 | 3 | 4 | 5 |
| ㄍ | | | | | | | | | | 1 | 4 | 2 | 3 | 2 | 3 | 4 | 3 | 2 | 3 | 4 | 3 |
| ㄎ | | | | | | | | | | | 3 | 3 | 2 | 1 | 4 | 3 | 2 | 3 | 4 | 3 | 2 |
| ㄏ | | | | | | | | | | | | 4 | 3 | 2 | 3 | 2 | 1 | 2 | 5 | 4 | 3 |
| ㄐ | | | | | | | | | | | | | 1 | 2 | 1 | 2 | 3 | 2 | 1 | 2 | 3 |
| ㄑ | | | | | | | | | | | | | | 1 | 2 | 1 | 2 | 3 | 2 | 1 | 2 |
| ㄒ | | | | | | | | | | | | | | | 3 | 2 | 1 | 2 | 3 | 2 | 1 |
| ㄓ | | | | | | | | | | | | | | | | 1 | 2 | 1 | 2 | 3 | 4 |
| ㄔ | | | | | | | | | | | | | | | | | 1 | 2 | 3 | 2 | 3 |
| ㄕ | | | | | | | | | | | | | | | | | | 1 | 4 | 3 | 2 |
| ㄖ | | | | | | | | | | | | | | | | | | | 3 | 4 | 3 |
| ㄗ | | | | | | | | | | | | | | | | | | | | 1 | 2 |
| ㄘ | | | | | | | | | | | | | | | | | | | | | 1 |
| ㄙ | | | | | | | | | | | | | | | | | | | | | |

Split commands can be provided for Chinese and English spelling modes, for example, for better recognition results. For example, a split can be made for "中文拼字" (meaning "spelling for Chinese characters/words") and "英文拼字", (meaning "spelling for English words"). Reasons for doing this include the following. When people spell using English, presents an indexed and ordered list 712 of English letters and/or other characters (e.g., @). Although illustrated in this embodiment as being different to some degree, it is desirable that the panels 600 and 700 have a more similar look for providing a more consistent user experience except the features that occur in one but not the other.

Figure 8:
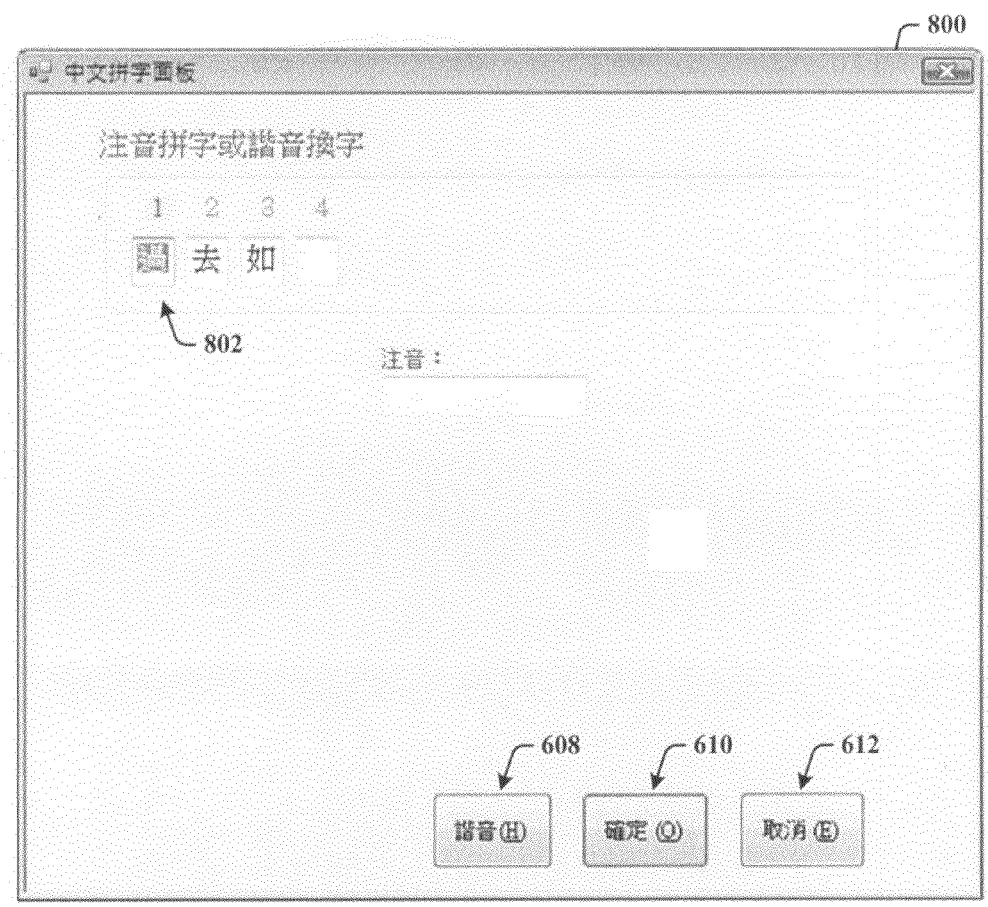
FIG. 8 illustrates a screenshot of a spelling dialog panel presented for homophone command processing.
Figure 9:
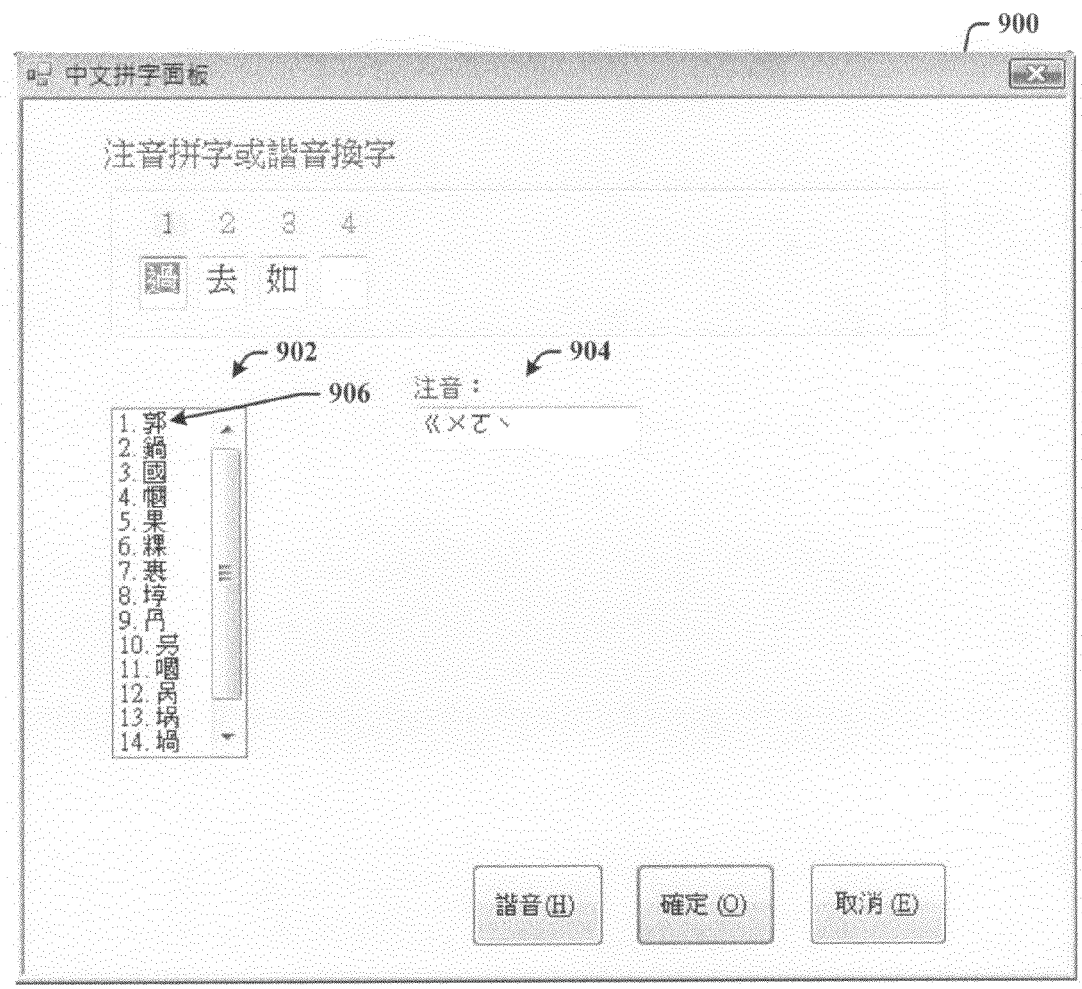
FIG. 9 illustrates a screenshot of a spelling mode dialog panel presented in response to a voice activated command for homophone correction.
Figure 10:
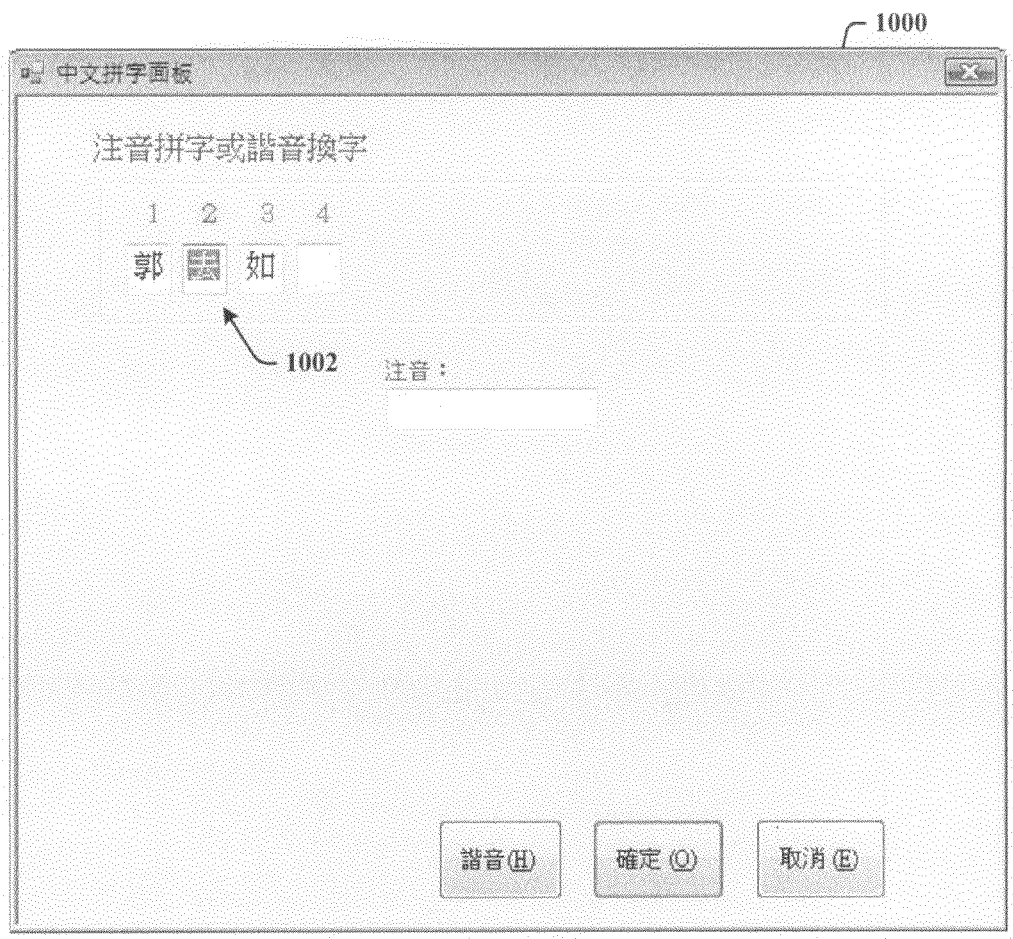
FIG. 10 illustrates a panel where the misrecognized word is corrected and the list box has been cleared in response to voiced index selection.

FIGS. 8-10 present screenshots associated with the process of using homophone correction. FIG. 8 illustrates a screenshot of a spelling dialog panel 800 presented for homophone command processing. A command is voiced for obtaining the correct character, which is the homophone. The displayed/recognized word is provided as "諧音" (meaning "homophone") in 608. This voice-command interface can be considered more efficient than typing, since repeated typing of the phonetic symbols can be avoided. In other words, sometimes the voiced command is recognized properly, but the user wants a different character. Rather than prompting the user to repeat the pronunciation, the command can be processed to output the homophone list. Using this function, correction by voice provides an improved user experience over manual input (e.g., typing). That is, when the user manually enters the pronunciation by typing and chooses the word from the homophone list, the word will be presented as text with dotted line underlining. In that mode, the user can still change the characters from the list.

However, when user is sure of the words, the user can select the Enter (or "OK") selector 610 to lock the word in the text so that the input system will not auto-adjust the word from an assigned LM score. Therefore, once a word is locked in the dialog panel 800, if the user wants to change the word again, the phonetic symbols must be retyped. The voice command interface saves the extra effort required by manual entry, by recognizing the "諧音" ("homophone") command. As a first step, the user selects the words to be corrected by speaking "更正一號字" ("correct the first character"). A first character 802 is then highlighted. The user can then speak 諧 音 for the homophone or select the 諧音 ("homophone") selector 608 to obtain the homophone (H) characters for the original Chinese characters. The panel 800 also presents the dialog selectors in Chinese: the Homophone selector 608, the OK selector 610, and the Cancel selector 612.

Note that correction through homophone command or providing pronunciation can be performed on any characters (in fields labeled 1, 2, or 3) in the panel 800 in which 802 is the first character. The candidate character list will be different, however. The candidate list from homophone command will contain characters that are the same or slightly different by tone. The candidate list from providing pronunciation will contain characters that match exactly the pronunciation given by the users. If pronunciation were to be employed by the user, the screenshot of FIG. 8 will be presented with the second character highlighted rather than the first character 802 as shown in FIG. 10. Then the screenshot of FIG. 11 is presented after pronunciation is provided by the user.

FIG. 9 illustrates a screenshot of a spelling mode dialog panel 900 presented in response to a voice activated command for homophone correction. The pronunciation of the original characters is supported by the spelling wizard such that an indexed homophone character list is presented in a list box 902. The user can then choose the desired character by speaking the associated index number such as " — " ("one") or "一號" ("number one") for the first candidate, or clicking on character 906, in this case. In response, the pronunciation panel 900 will clear the list box 902, replace the original character 802 with the selected character 906, and as shown in FIG. 10 as a panel 1000 where the list box 902 has been cleared in response to a voiced index selection. The wizard then moves interaction to a second character 1002 (in a second field) for similar processing, as described above in accordance with the character 802 (in a first field) of FIG. 8.

Continuing with FIG. 10, voiced correction can be done by providing pronunciation. The user begins by selecting or navigating to the words to be corrected by speaking "更正二號字" ("correct the second character") to cause highlighting of the second character 1002, if the wizard has not already moved and highlighted the second character 1002.

Figure 11:
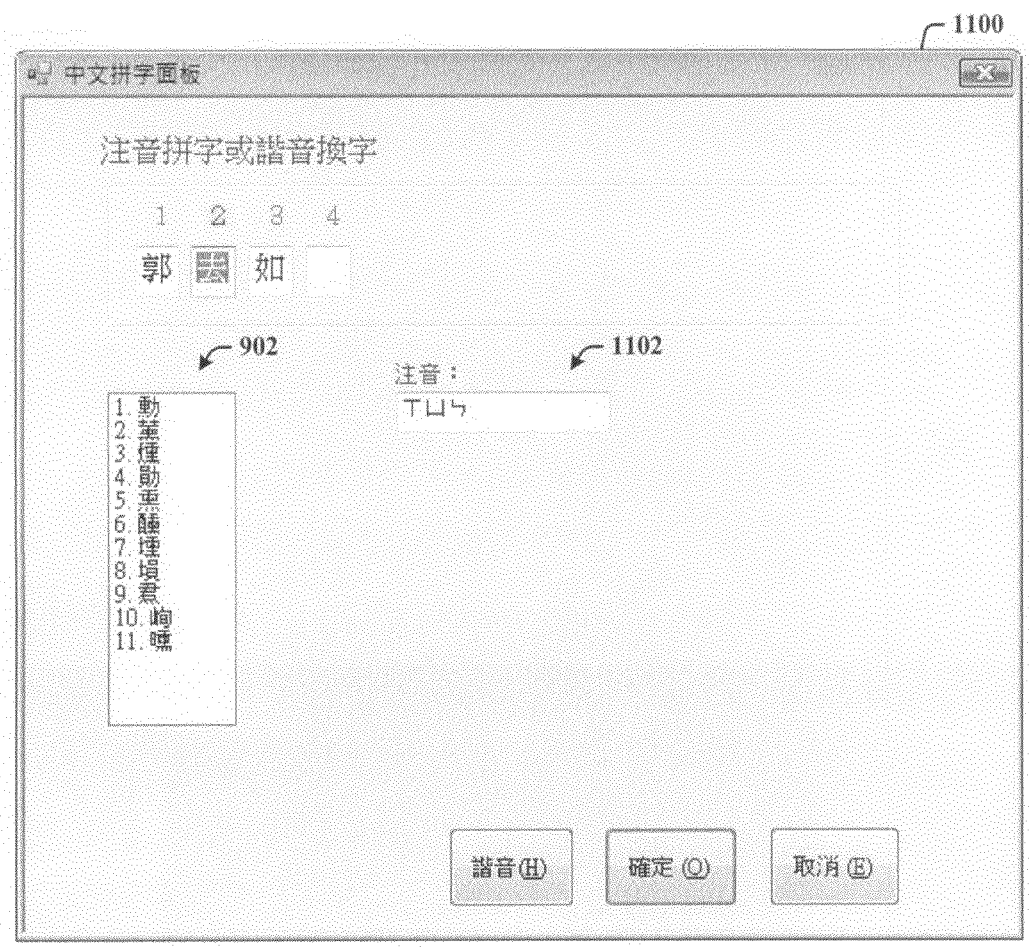
FIG. 11 illustrates a screenshot of a spelling dialog panel presented for voice pronunciation.

FIG. 11 illustrates a screenshot of a spelling dialog panel 1100 presented for voice pronunciation. Next, the user voices "ㄒㄩㄣ" for the pronunciation, which pronunciation is presented back to the user in a pronunciation field 1102 and the wizard again provides the indexed list of words in the list box 902. The list box 902 lists the candidate words in order by the more-frequently used words at the top, and to the less-frequently used words near the bottom. In addition, when the system dictates the first character 802 is corrected with a key word such as family names, the system will detect the key word and adjust the correction of the following character candidate list. In this case, the characters used for first name will be promoted to top of the candidate list 902 in the correction for the remaining characters. As before, the user can then select the desired character by voicing the associated index number such as 二" ("two") or "二號" ("number two") associated with the second candidates to obtain "蕙". Thereafter, the selected candidate replaces the old character and the pronunciation panel 1100 will be cleared and the list box 902 is removed from the dialog.

Figure 12:
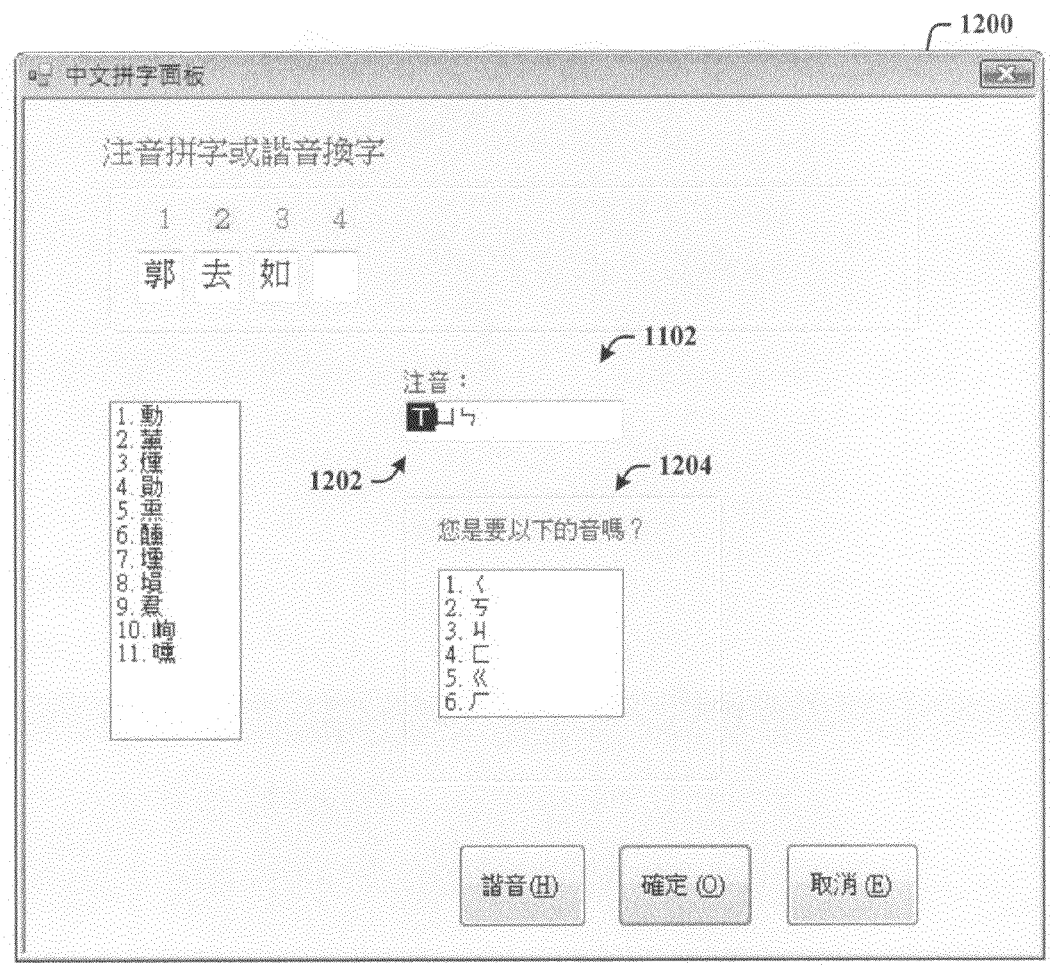
FIG. 12 illustrates a screenshot of a spelling dialog panel presented for correction of voiced pronunciation.

If the SR recognized the pronunciation incorrectly, the wizard will display the closest phonemes based on the confusion matrix described above. FIG. 12 illustrates a screenshot of a spelling dialog panel 1200 presented for correction of voiced pronunciation. The user can interact with the wizard by voicing the phoneme to be corrected by speaking, for example, "更正第一個音" ("correct the first phoneme"). The first phoneme 1202 will then be highlighted. A phonemes list box 1204 will then be presented with a list of phonemes, in order of phoneme distance. The user can then voice "ㄑ" (="qi" in Pinyin) to cause the first misrecognized phoneme 1202 to be replaced with the corrected phoneme "ㄑ" as indexed "1" in the list box 1204.

Figure 13:
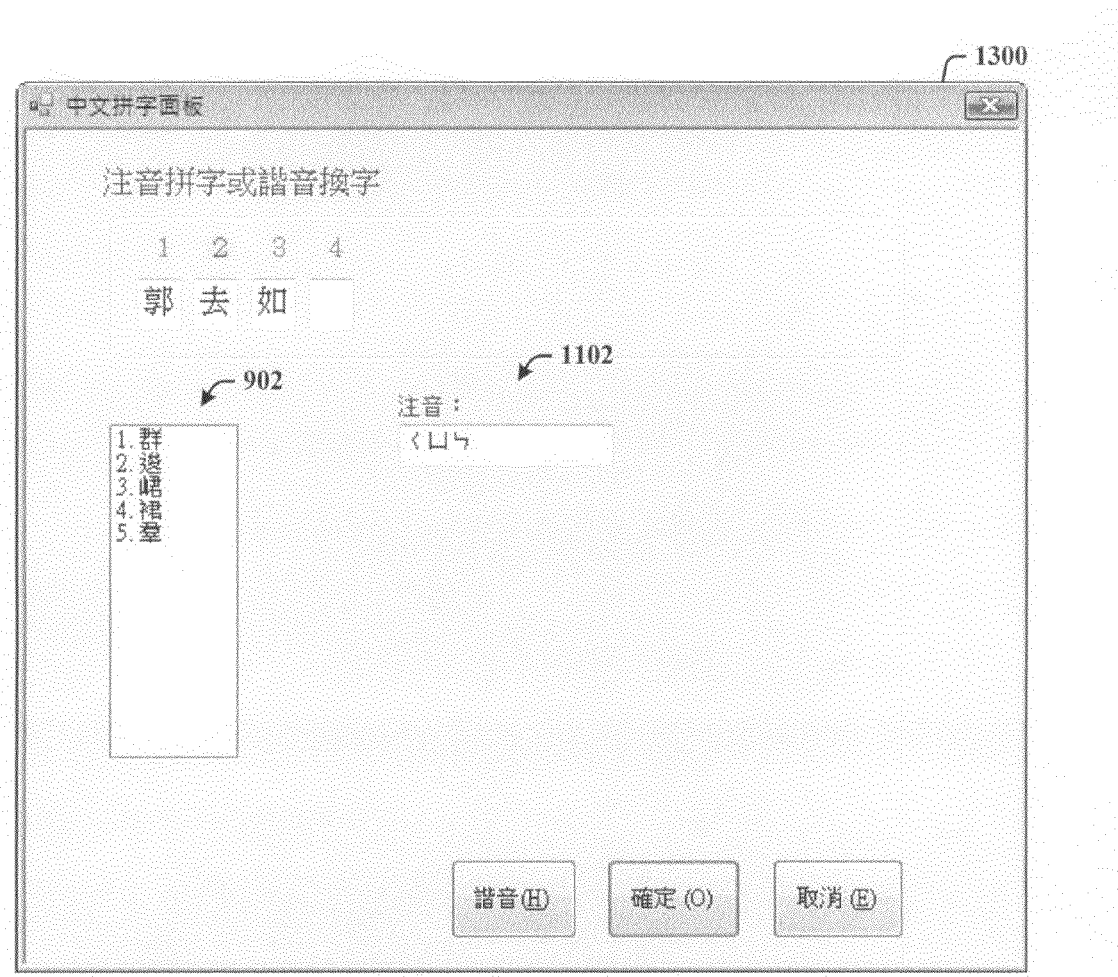
FIG. 13 illustrates a screenshot of a spelling dialog panel presented with a revised homophone list box based on correction of the voiced pronunciation.
Figure 14:
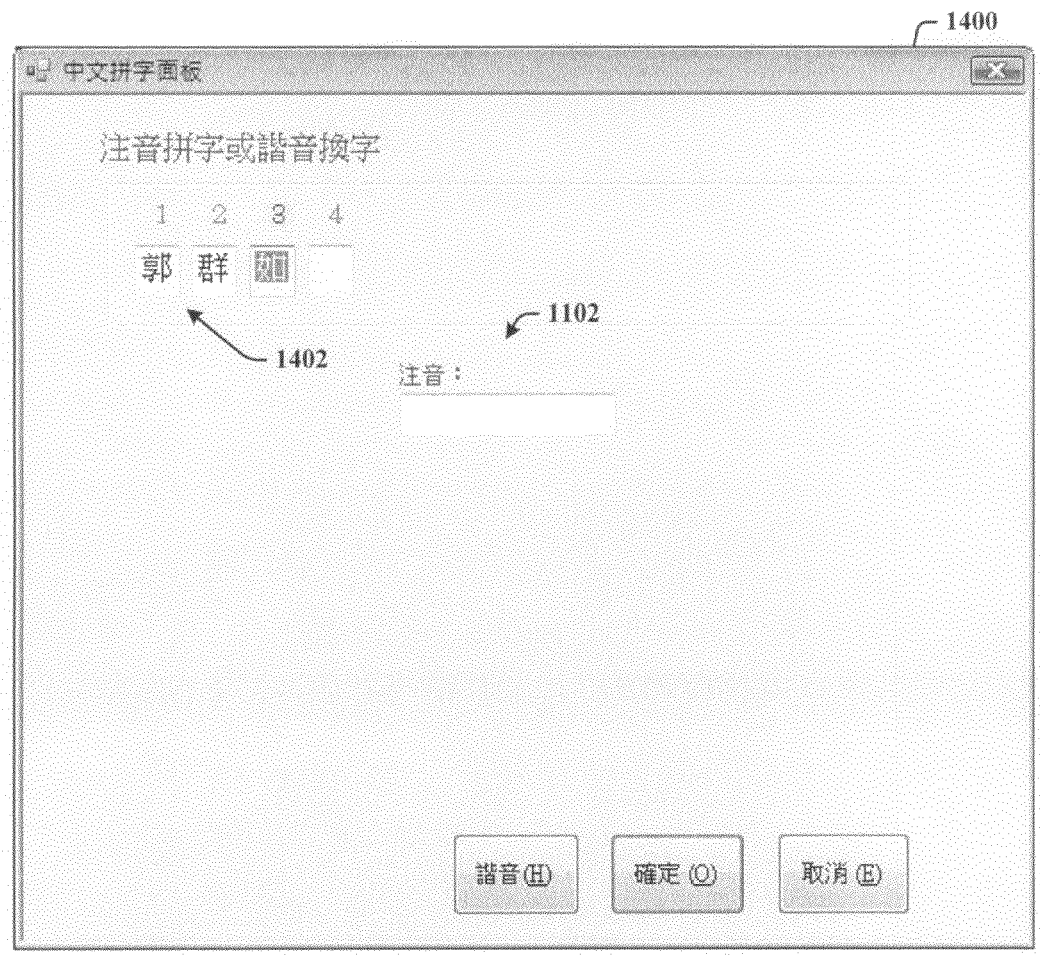
FIG. 14 illustrates a screenshot of a spelling dialog panel presented when the misrecognized word is corrected, and the cursor moves to a next character for voiced pronunciation processing so that user can continue the correction on the next character if needed.

FIG. 13 illustrates a screenshot of a spelling dialog panel 1300 presented with the revised homophone list box 902 based on correction of the voiced pronunciation. The homophone character list box 902 is corrected based on the changed phoneme. Next, the user chooses the first character 1402 illustrated in FIG. 14, by voicing the associated number such as " — " ("one") or "一號" ("number one"), in this case. Accordingly, the selected candidate replaces the original one and the pronunciation field 1102 will clear and the list box 902 is removed from the dialog. FIG. 14 illustrates a screenshot of a spelling dialog panel 1400 presented when the cursor is moved to the next character for voiced pronunciation processing or when the processing of FIG. 13 has completed.

As described herein, names are likely to require the spelling wizard, since each user will not know exactly the characters used in the names. Therefore, hints can be obtained from the name and provided. For example, in some cases, there may be only a few hundred of the type of last name under consideration, and as described above, the set is known to be fixed. Thus, when the last name is selected, which should always be the first character of a word/character strings, the character candidate list displayed in the list box will be adjusted. For example, for a name that uses 'fan', the character can be 凡 (meaning "common"), 繁 ("complicated"), 煩 ("annoying"), 藩 ("barbarian"), 犯 ("prisoner"), etc.

For most characters, the user will chose for the name the positive or neutral meaning, shown in the first two examples above. However, if most of the training data was obtained from a newspaper, which is the case for most current language training systems, the character may be associated the last meaning 犯 ('prisoner') with a very high frequency count. Therefore, by providing category information in the data files the list of words can be adjusted according to the hints. Hints that can be considered include, but are not limited to, personal names (e.g., family names), street names (e.g., making use of 路 ("road"), 街 ("street"), 市 ("city"), and 縣 ("county")), and company/organization names (e.g., making use of 公司 ("company") and 院 ("org")).

The above scenario is easier to process (or recognize) by the disclosed system when the user becomes more familiar or adept at selecting a word with multiple characters while in spelling mode, and correctly parsing the word (for word boundaries) based on the limited character sequence. If user only selects one character out of a word of multiple characters, the system may lose the information of word boundary for the new word.

Figure 15:
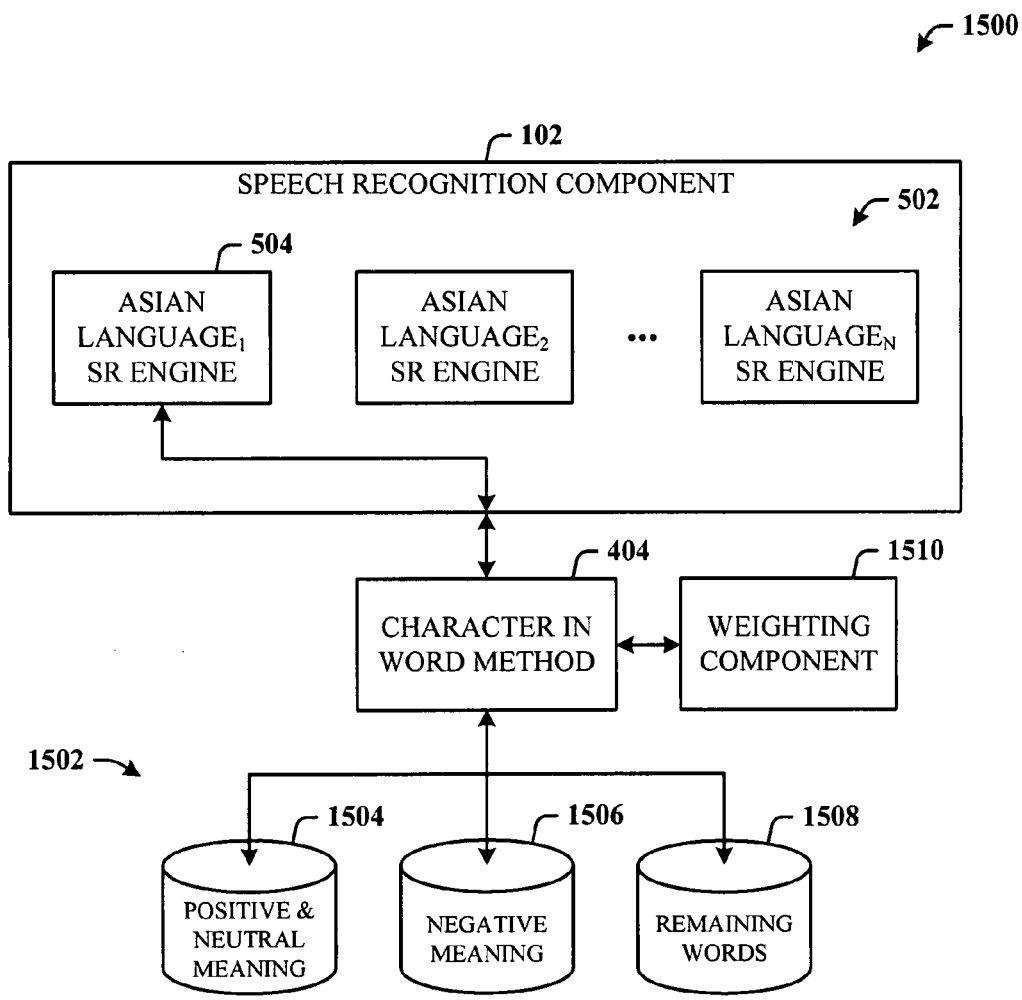
FIG. 15 illustrates a system that employs positive, neutral and negative meanings for character weighting in accordance with the second method.

The second method referred to above obtains Chinese characters by voice input of words containing desired characters. FIG. 15 illustrates a system 1500 that employs positive, neutral and negative meanings for character weighting in accordance with the second method. The recognition component 102 of FIG. 15 shows the plurality 502 of Asian language engines, where the first engine 504 uses the character-in-word method 404, which further uses data files 1502 for providing data. Each language engine 502 can use the data files 1502 for obtaining characters based on the character-in-word method 404. A first data file 1504 includes positive and neutral meaning words, a second data file 1506 includes negative meaning words, and a third data file 1508 includes the remaining words in the lexicon that are not part of the data files (1504 and 1506).

In accordance with character-in-word method 404, and/or the addition to providing pronunciation to obtain the characters, a user can also obtain characters by giving other words that contain the desired character(s). Similar to "a, as in apple", users can specify a desired character such as 蕉 by voicing a word "蕉陶的蕉" which contains the character. "蕉陶" is the word that contains the desired character "蕉". The word "的" is the possessive form indicating the desired character to be part of the word.

In order to obtain SR recognition accuracy, it is desirable to have information or data about the words people tend to use to specify a character. In many cases, people tend to use mostly-frequently used words and also words with positive semantic meanings, to specify the characters. Following are ways in which words can be obtained for a CFG. A large corpus of names can be collected in order to have a list of characters that typically will be used in such names. Moreover, the corpus should be a small subset of the valid characters.

Additionally, recognition accuracy can be improved by finding a large corpus of words that contain the characters, then grouping the words into the first group or file 1504 that includes positive or neutral meanings, and the second group or file 1506 that includes negative meanings. People tend to use words with positive or neutral meanings to specify the characters used in names. The system 1500 can include a weighting component 1510 to assign weighting data or values to words. The positive and neutral meanings can then be assigned a higher weighting value, with a middle weighting value assigned to negative meanings, and lower weighting values assigned to the remaining words in the lexicon that do not contain the characters people oftentimes use in names. Moreover, the words in the three groups can be ordered based on the word usage frequency using the frequency component 514 of FIG. 5.

This method applies to Chinese as well as to Kanji in Japanese, for example. The method is active when the UI cursor is over one of the characters in the top (or split or Chinese) panel of the spelling windows such as characters in 802, 1002, and 1402. That is, users can either provide pronunciation, or words containing the characters to ultimately obtain the desired character(s).

Figure 16:
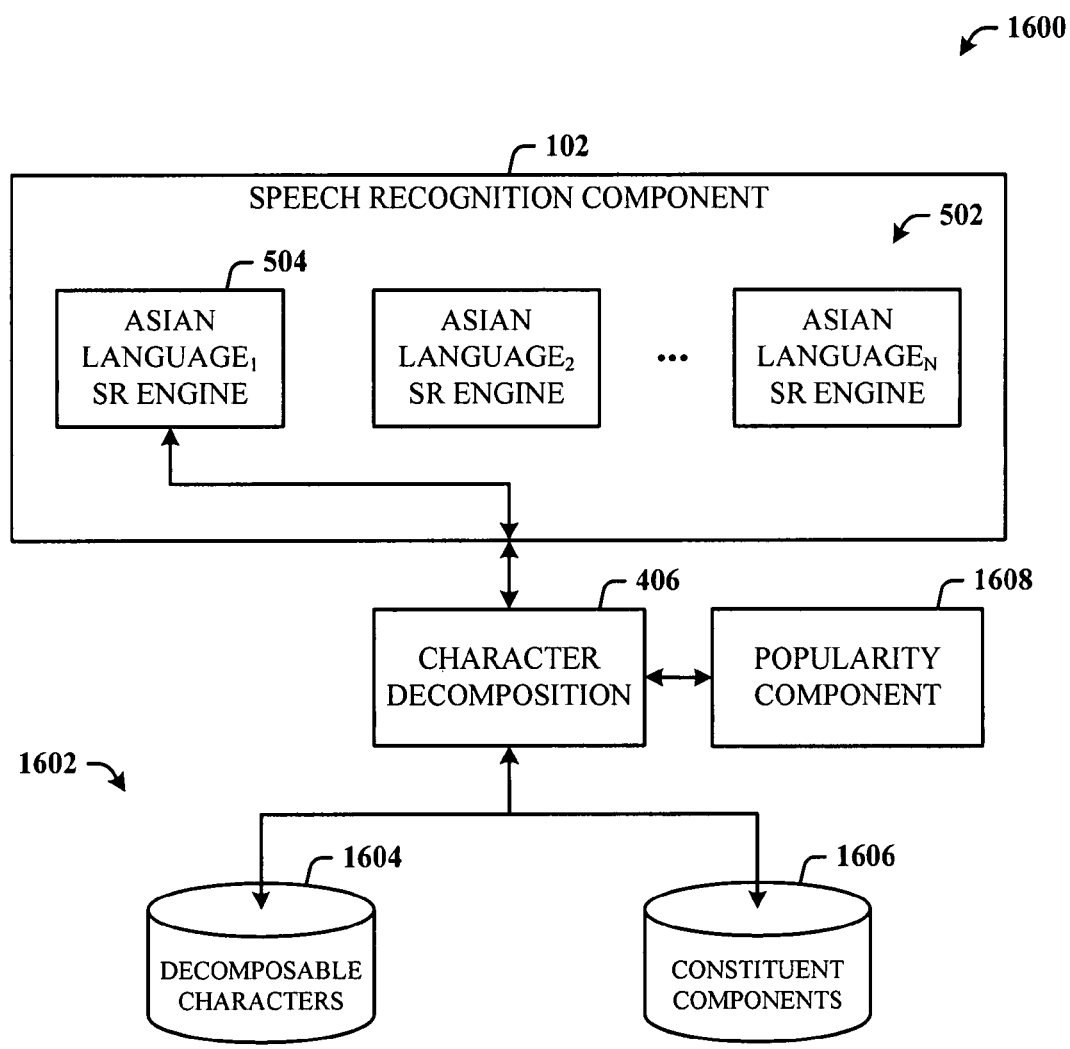
FIG. 16 illustrates a system that employs word decomposition by voice input of subcomponents of the desired character in accordance with the third method.

The third method 406 referred to above obtains Chinese characters by word decomposition. FIG. 16 illustrates a system 1600 that employs word decomposition by voice input of subcomponents of the desired character in accordance with the third method. The recognition component 102 shows the plurality 502 of Asian language engines, where the first engine 504 uses the character decomposition method 406, which further utilizes data files 1602 for providing data. Each language engine 502 can use the data files 1602 for obtaining characters based on the character decomposition method 406. A first data file 1604 includes decomposable characters and a second data file 1606 includes constituent components of the characters.

Users can obtain the desired characters by providing the subcomponent(s) of a word by speaking "木子;李" to specify 李, where "木" ("wood") and "子" ("son") are the subcomponent symbols combined to form 李; "木" is the top symbol of the character and "子" is the bottom symbol.

It is to be appreciated that not many characters are decomposable and also popularly used by users. Consequently, all characters that can be decomposed, and decomposable expressions that are popularly used, will be collected and included in the grammar. Similar to the second method 404, the third method 406 can be made active when the cursor is over one of the characters in the top panel of the split panels of the spelling wizard panels such as characters in 802, 1002, and 1402. In other words, users can provide pronunciation or the containing words, or the subcomponents, to get the desired characters. The system 1600 includes a popularity component 1608 for finding, processing and storing the popular characters 1604 and decomposing the characters into the constituent components 1606.

Referring briefly to FIG. 2, the sharing component 208 allows a user to share the local lexicon to improve SR accuracy or reduce correction efforts for other users. As the user works with the aspects of this architecture, the user can be "teaching" the system or the system can learn about the user's activities and/or system data/parameters (e.g., using the learning and reasoning capabilities of the inference component 302 of FIG. 3). As the user dictates, the probability of the words recognized can change to show which words are used most often. In addition, if a word does not appear in the default lexicon 202 of FIG. 2, the user can add it to a user-defined portion of the lexicon. At this point, the user can "tell" the speech recognizer 102 where the additional words can be found (e.g., default or user-defined) in the lexicon.

The ability to share, load, and unload new lexicons across multiple users facilitates providing a continually-improving distributed corpus. In other words, each user will be "teaching" individual user computers and methods using the same or similar words. In group or collaborative environments, for example, there is a benefit in sharing the user-defined lexicon with others. For example, in the context of a team project, as users update associated user lexicons with new words, sharing can propagate these new words other members of the project team. Sharing can be performed in a number of ways including a central location where a single file is shared among multiple users as well as batch sharing versus word-by-word sharing.

In addition to sharing with another user or a team, the sharing component 208 of the disclosed architecture includes the capability to provide feedback on what the speech recognizer 102 has learned, to a vendor entity so that the vendor can improve the default lexicon. To this end, the speech recognizer 102 can include a mechanism allowing the user to indicate whether the new word being added to the user-defined lexicon can be shared outside of the user system, the project team, and/or company boundaries. If allowed, the recognizer 102 can send the information to the vendor for review and inclusion into the default lexicon for the next public release or updates. However, if the user does not allow this, the newly-added term is not sent to the vendor. An example of a term that can be sent to the vendor is a new industry-wide word that has recently become popular in the community, whereas an example of a private word can be a company name or the internal name for a project. Security issues should be considered to ensure that sharing does not violate intellectual property rules, scope of content being shared, and decision making processes for sharing, for example.

The disclosed architecture also facilitates the use and implementation of commands for different Asian character sets. For example, the Japanese language has four different types of writing systems: Hiragana, Katakana, Kanji and Romaji. Hiragana can be considered as a Japanese phonetic system and also a valid writing system (similar to Spanish, in that what people write is the word sound). Katakana is a more formal writing system, which has a one-to-one mapping to Hiragana. Kanji is frequently used for writing names. Similar to Chinese, one set of Hiragana sounds can correspond to multiple homophones in Kanji. Therefore, the same spelling panels and processes can be employed to obtain Kanji from Hiragana.

Moreover, rather than providing a homophone function as in Chinese, a button for Hiragana and Katakana will be given so that if a user wants just Hiragana or the corresponding Katakana, the voice-command capability or buttons to get the words in the top word panel of the split panel method (1708 in FIG. 17 or 1806 in FIG. 18) can be utilized. There can be a button or selector for the user to select and/or a voice-command by the button name to convert Hiragana to Romaji. Since one set of Hiragana may correspond to multiple Romaji characters, when a user voices Hiragana pronunciations, for example, "ローマ字" ("Romaji") to trigger the Romaji conversion, the list box used to list homophones of Kanji will be cleared and repopulated with the results for Romaji. Then, users can say the index number preceding the desired Romaji character to move that Romaji character to the top word panel (1708 in FIG. 17 or 1806 in FIG. 18).

For example, for the character "土" ("dirt"), the output for this character in the four writing systems of Hiragana, Katakana, Kanji and Romaji are the following:

Hiragana: つち
Katakana: ツチ
Romaji: tsuchi, tuchi, tuti
Kanji: 土

There are other Kanji characters that share the same pronunciation—the same Hiragana, for example, Kanji homophone: 槌, 鎚, 堆, 椎

Figure 17:
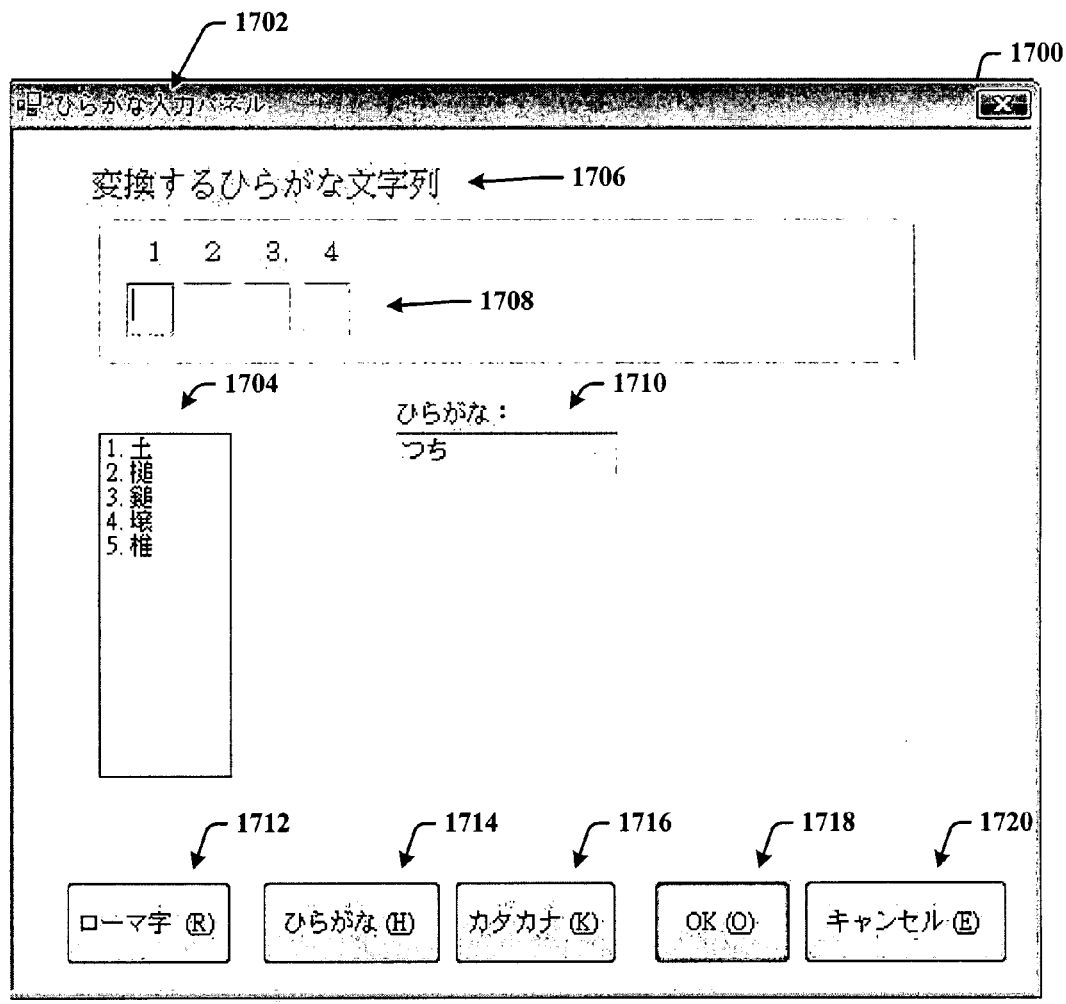
FIG. 17 illustrates a screenshot of a spelling dialog panel presented for Japanese language recognition and processing by voice/type input of Hiragana to obtain Kanji.

FIG. 17 illustrates a screenshot of a spelling dialog panel 1700 presented for Japanese language recognition and processing by voice/type input of Hiragana to obtain Kanji. The panel 1700 includes a title bar indicating the use of Hiragana. A list box 1704 shows Kanji homophones list or 1802 in FIG. 18 for a Romaji word list. String 1706 tells users to use Hiragana as input to process the conversion to the desired writing systems. A word panel 1708 stores the final characters to be input to the word processor application. A pronunciation field 1710 shows the recognized input for processing. The panel 1700 also includes the following selectors: a Romaji (R) selector 1712, a Hiragana (H) selector 1714, a Katakana (K) selector 1716, an OK (O) selector 1718, and a Cancel (E) selector 1720.

To obtain Kanji characters, a user can voice "ひらがな入力パネル" ("Hiragana input panel") to trigger the wizard spelling panel 1700, then speak "つち" ("dirt" in Hiragana), which is presented as feedback to the user in the pronunciation field 1710 (after which the list box 1704 will automatically generate a list of Kanji homophone characters with number indexes preceding each character). The user can then voice "番" ("number one") to cause the 1$^{st}$ word "土" in the list box 1704 to be moved to the word panel fields 1708. The list box 1704 is no longer exposed after that. The user can then say "OK" to close the spelling panel 1700 and the word "土" in the word panel 1708 will be copied to the document, using any word processor currently being used.

In order to obtain Hiragana, the user can say "ひらがな入力パネル", to trigger launching of the spelling panel 1700. When the user speaks "つち" so that つち is presented in a pronunciation field 1710, the list box 1704 will automatically generate a list of Kanji homophone characters as default list; however, the user can choose to ignore the list. Next, the user can voice "ひらがな" ("Hiragana") and the recognized "つち" in 1710 will automatically be moved into the word panel 1708. The list box 1704 will then be removed, since it is no longer needed. By saying "OK", the user causes the dialog spelling panel 1700 to close and the word in the word panel 1708 will be copied into the currently opened document.

In order to obtain Katakana, the user can voice "ひらがな入力パネル" to trigger launch of the spelling panel 1700. When the user speaks "つち" so that "つち is presented in the pronunciation panel field 1710, the list box 1704 will automatically generate a list of Kanji homophone characters; however, the user can choose to ignore the list. Next, the user can say "カタカナ" ("Katakana"), and the system will obtain Katakana version as "ツチ" ("dirt" in Katakana") and the system will write "ツチ" directly in the word panel 1708. The list box 1704 can then be made to disappear, since it is no longer needed. The user can select "OK" to close the spelling panel 1700, and the word in the word panel 1708 will be copied into a document via the existing word processor.

Figure 18:
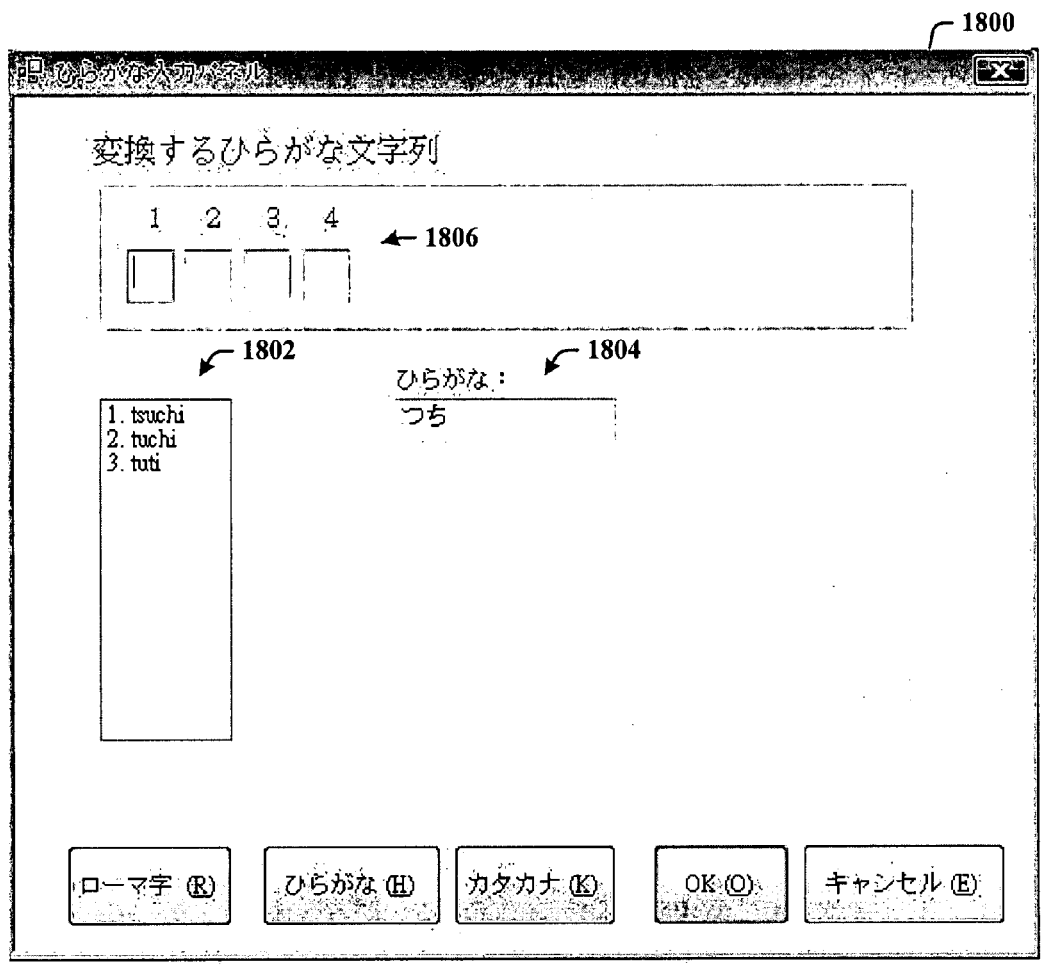
FIG. 18 illustrates a screenshot of a spelling dialog panel presented for Japanese language recognition and processing related to obtaining Romaji.

FIG. 18 illustrates a screenshot of a spelling dialog panel 1800 presented for Japanese language recognition and processing related to obtaining Romaji. In order to obtain Romaji, a user can speak "ひらがな入力パネル" to trigger the spelling panel 1800 to open. When the user voices "つち" so that "つち" is presented in a pronunciation panel field 1804, a list box 1802 will automatically generate a list of Kanji homophone characters in the list box 1802; however, the user can ignore this list. If the user voices "ローマ字" ("Romaji"), the system will convert "つち" into the Romaji version. Since there are multiple candidates for the Romaji version, the Kanji candidates in the list box 1802 are replaced with candidates of Romaji. The user can then voice "1番" to obtain the 1$^{st}$ word in the list box 1802 such that "tsuchi" is moved to the word panel 1806. The list box 1802 can then be made to disappear. If the user says "OK", the spelling panel 1800 closes and the word in the word panel 1806 will be copied into the document or word processor currently being used.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Figure 19:
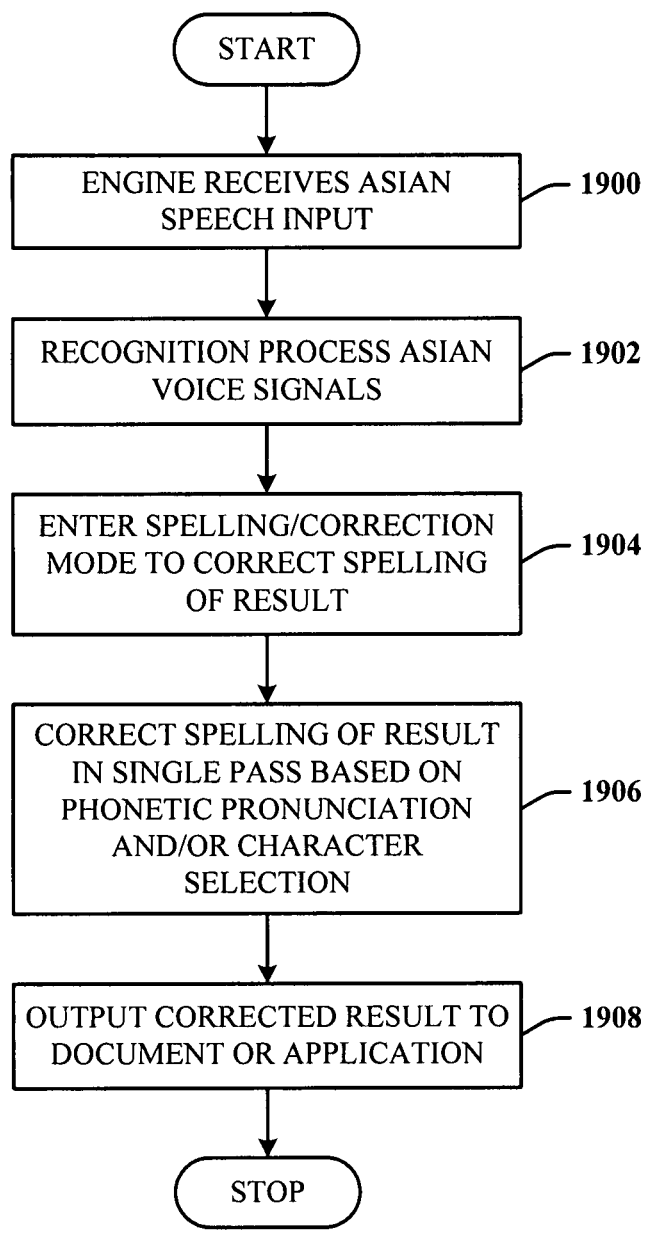
FIG. 19 illustrates a method of recognizing speech in accordance with the disclosed architecture.

FIG. 19 illustrates a method of recognizing speech in accordance with the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 1900, a speech recognition engine receives speech input in the form of Asian speech. At 1902, the Asian voice signals are recognition processed to output a result. At 1904, a spelling/correction mode is entered to spell new words or correct the result. At 1906, the spelling of the result is corrected in a single pass based on phonetic pronunciation and/or character selection. At 1908, the corrected result is then output to a document or application.

Figure 20:
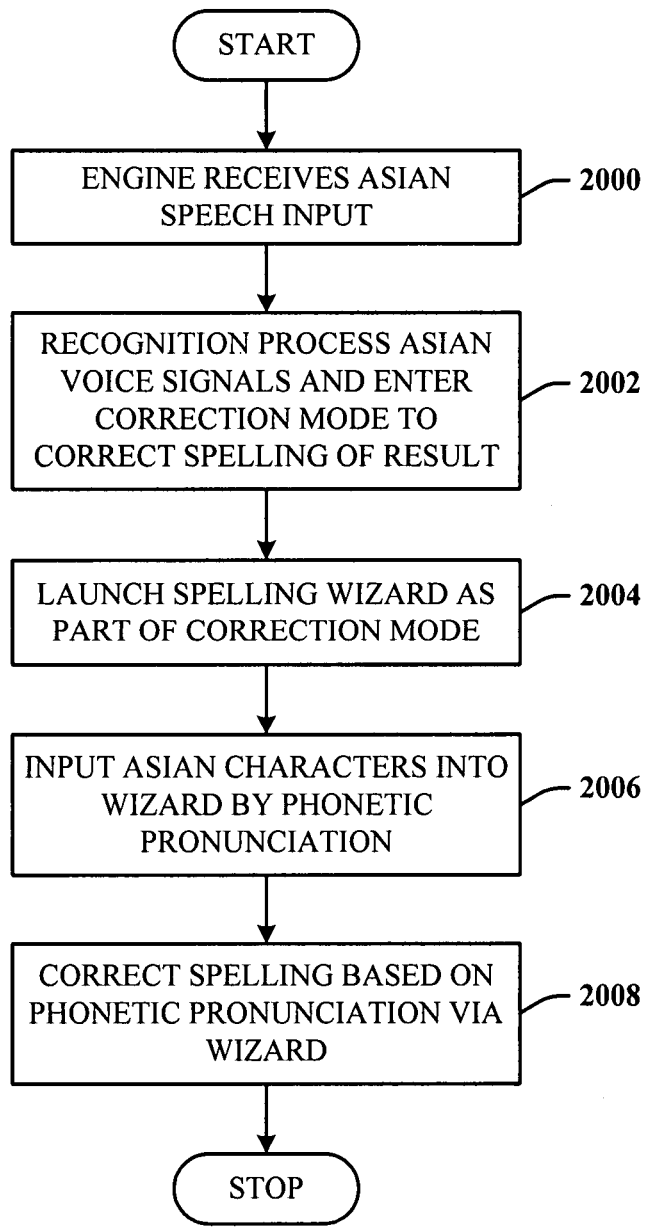
FIG. 20 illustrates a method of correcting recognition results using a spelling wizard.

FIG. 20 illustrates a method of correcting recognition results using a spelling wizard. At 2000, a recognition engine receives Asian speech input. At 2002, the Asian voice signals are recognition processed and a correction mode entered to correct spelling of the result. At 2004, a spelling wizard is launched as part of the correction mode. At 2006, Asian characters are input into the wizard by phonetic pronunciation. At 2008, the spelling is corrected based on phonetic pronunciation via the wizard.

Figure 21:
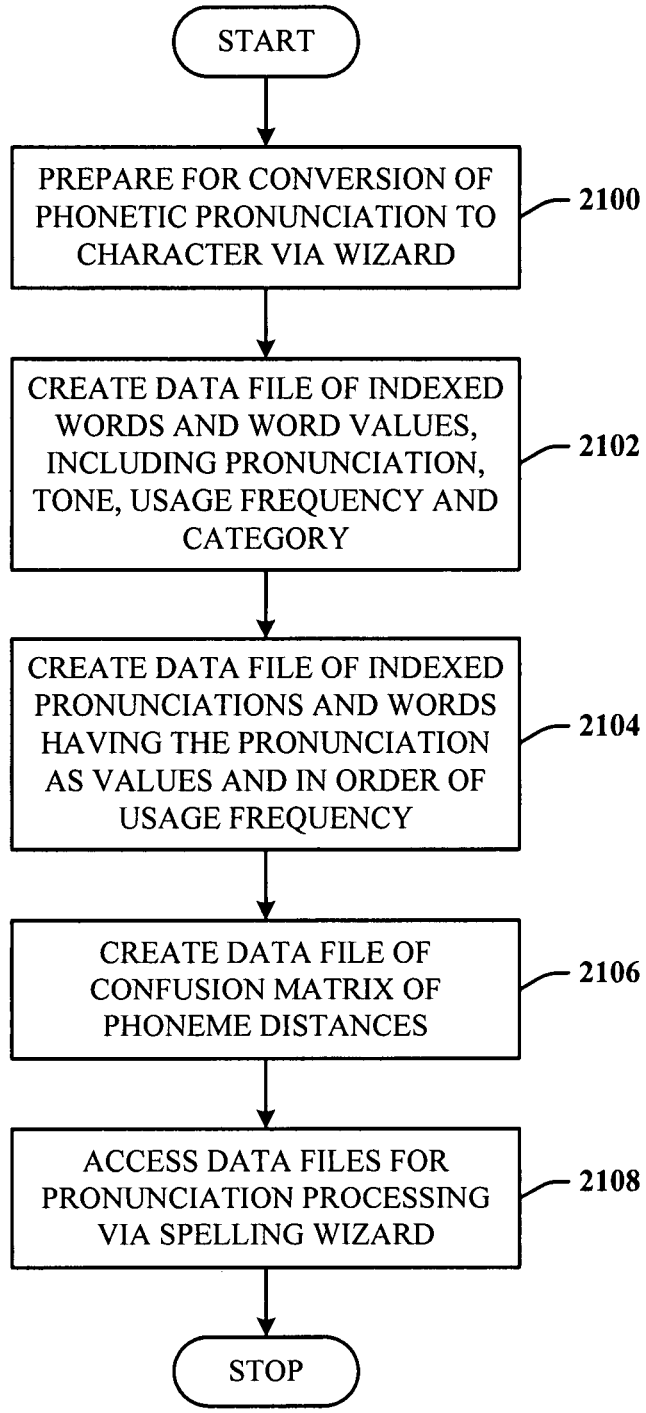
FIG. 21 illustrates a method of converting phonetic pronunciation to a character.

FIG. 21 illustrates a method of converting phonetic pronunciation to a character. At 2100, data file preparation commences for the conversion process. At 2102, a data file is created of indexed words and word values, the values including pronunciations, tone, usage frequency and category. At 2104, a data file is created of indexed pronunciations and words having pronunciations as values, and in order of usage frequency. At 2106, a data file is created of a confusion matrix of phoneme distances. At 2108, the data files are accessed for pronunciation processing via the spelling wizard.

Figure 22:
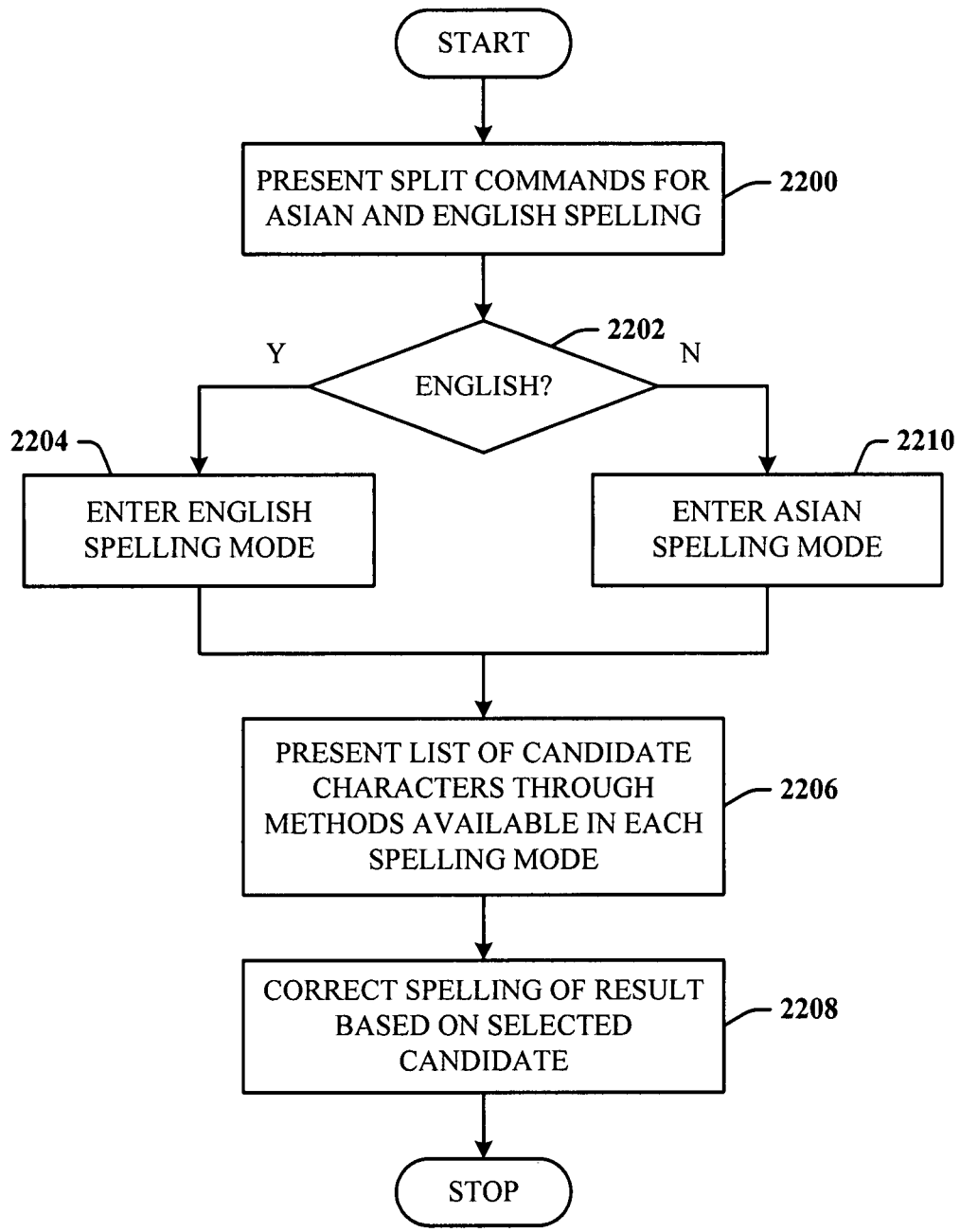
FIG. 22 illustrates a method of using split commands in Asian and English for correction processing.

FIG. 22 illustrates a method of using split commands in Asian and English for correction processing. At 2200, split commands in both Asian and English are presented. At 2202, a check is made whether to enter the English spelling correction mode. If so, at 2204, the English spelling mode is entered. At 2206, a list of candidate characters is presented based on the voice signals through methods available in the spelling mode. At 2208, the new words are spelled or the misrecognized words are corrected based on the selected candidates. If, at 2202, the English spelling mode is not to be entered, flow is to 2210 to enter the Asian spelling mode, and then to 2206 to continue as previously described.

Figure 23:
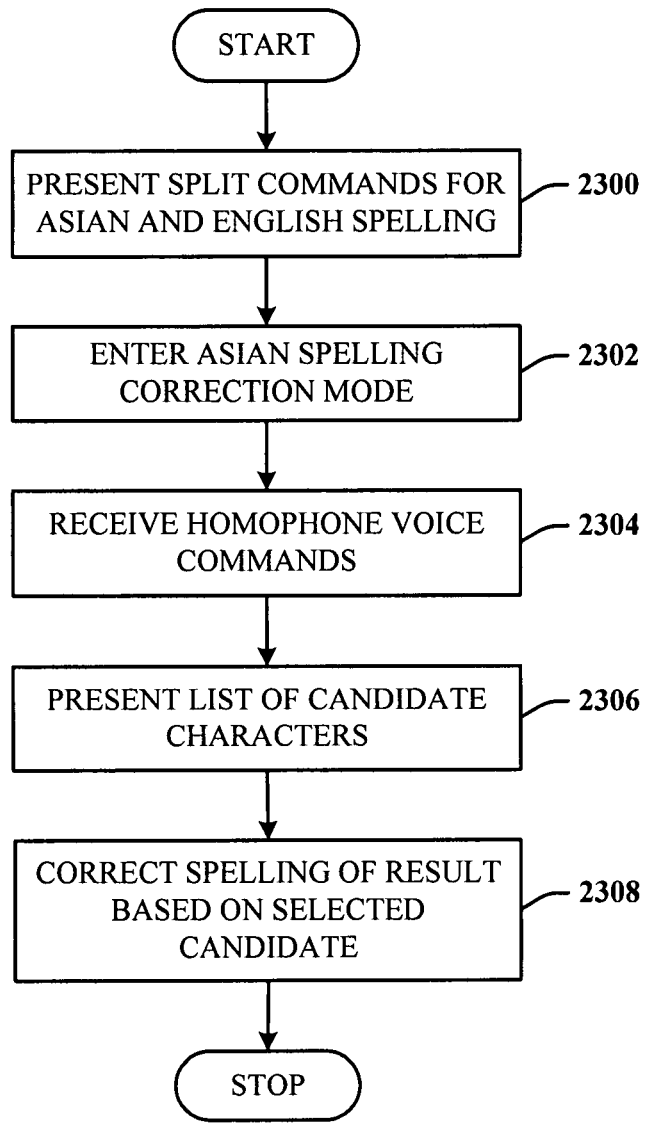
FIG. 23 illustrates a method of using homophone commands in an Asian spelling wizard.

FIG. 23 illustrates a method of using homophone commands in an Asian spelling wizard. At 2300, split commands in both Asian and English are presented. At 2302, the Asian spelling correction mode is entered. At 2304, homophone commands are received. At 2306, a list of candidate characters is presented based on the homophone characters of the target character. At 2308, the misrecognized words are corrected based on the selected candidates.

Figure 24:
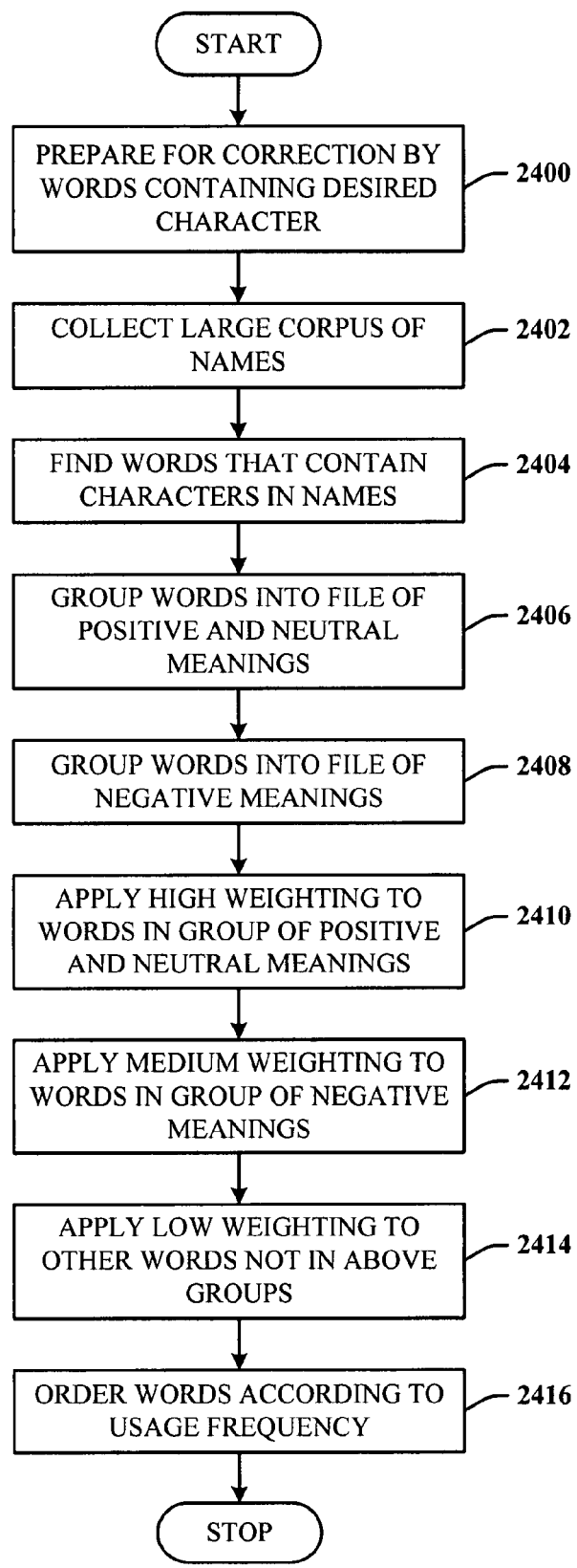
FIG. 24 illustrates a method of applying weighting values to word meanings.

FIG. 24 illustrates a method of applying weighting values to word meanings. At 2400, preparation for correction by words containing the desired characters is initiated. At 2402, a large corpus of names is collected. At 2404, words that contain the characters in the names are found. At 2406, the words are grouped into a file of positive and neutral meanings. At 2408, words are grouped into a file of negative meanings. At 2410, a high weighting is applied to the words in the positive and neutral meanings group. At 2412, a medium weighting is applied to words in the negative meanings group. At 2414, a low weighting is applied to words not in the other two groups. At 2416, the words are ordered according to usage frequency.

Figure 25:
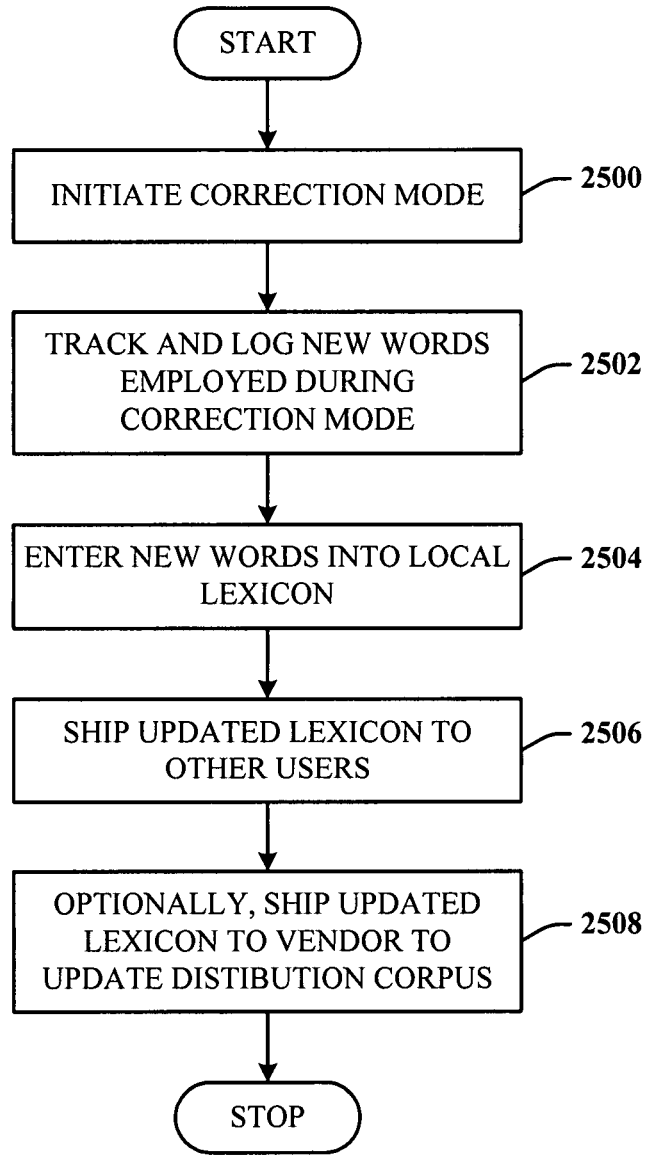
FIG. 25 illustrates a method of sharing an updated lexicon.

FIG. 25 illustrates a method of sharing an updated lexicon. At 2500, the correction mode is entered. At 2502, new words employed during the correction mode are tracked and logged. At 2504, the new words are entered into the local lexicon. At 2506, the updated lexicon is then shipped to other users. At 2508, optionally, the user can ship the updated lexicon to the vendor to update the distribution lexicon corpus.

Figure 26:
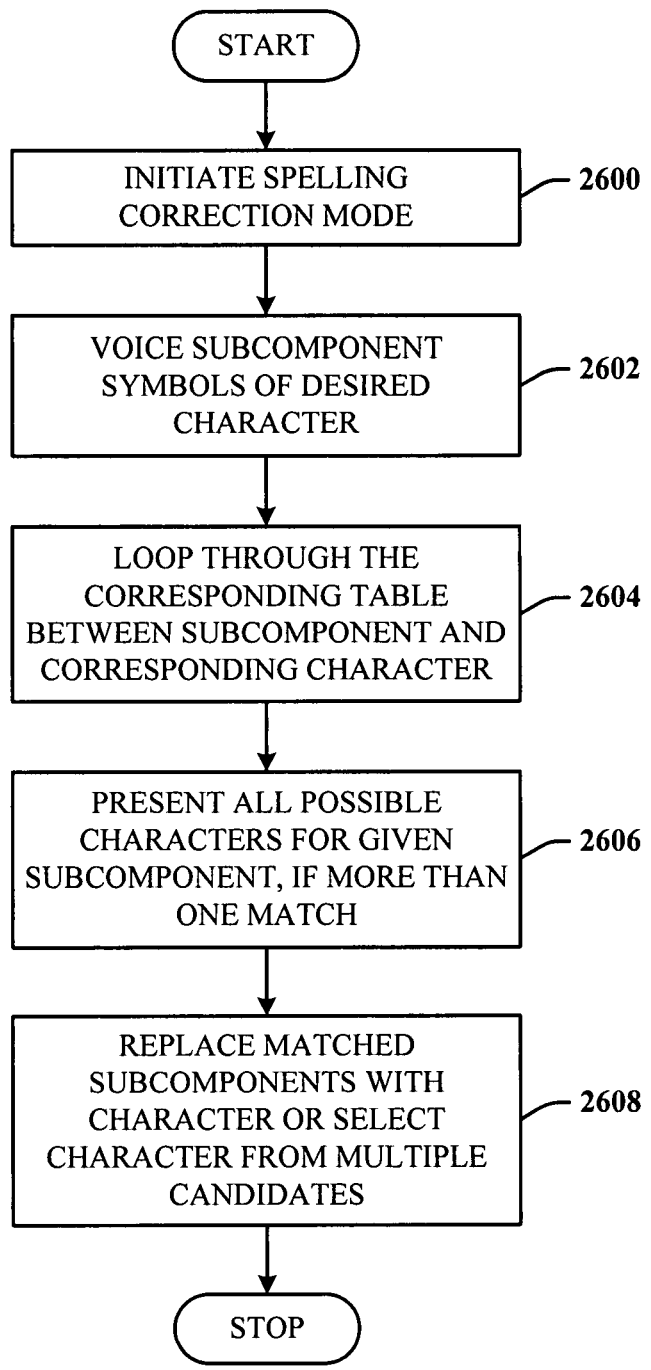
FIG. 26 illustrates a method of using character decomposition for spelling correction.

FIG. 26 illustrates a method of using character decomposition for spelling correction. At 2600, the spelling correction mode is initiated. At 2602, the user voices subcomponent symbols of the desired character. At 2604, the method loops through the corresponding table of relationships between subcomponent and respective character. At 2606, all possible characters for the subcomponent are presented, if there is more than one match. At 2608, the candidate character is then selected based on the subcomponents.

Figure 27A:
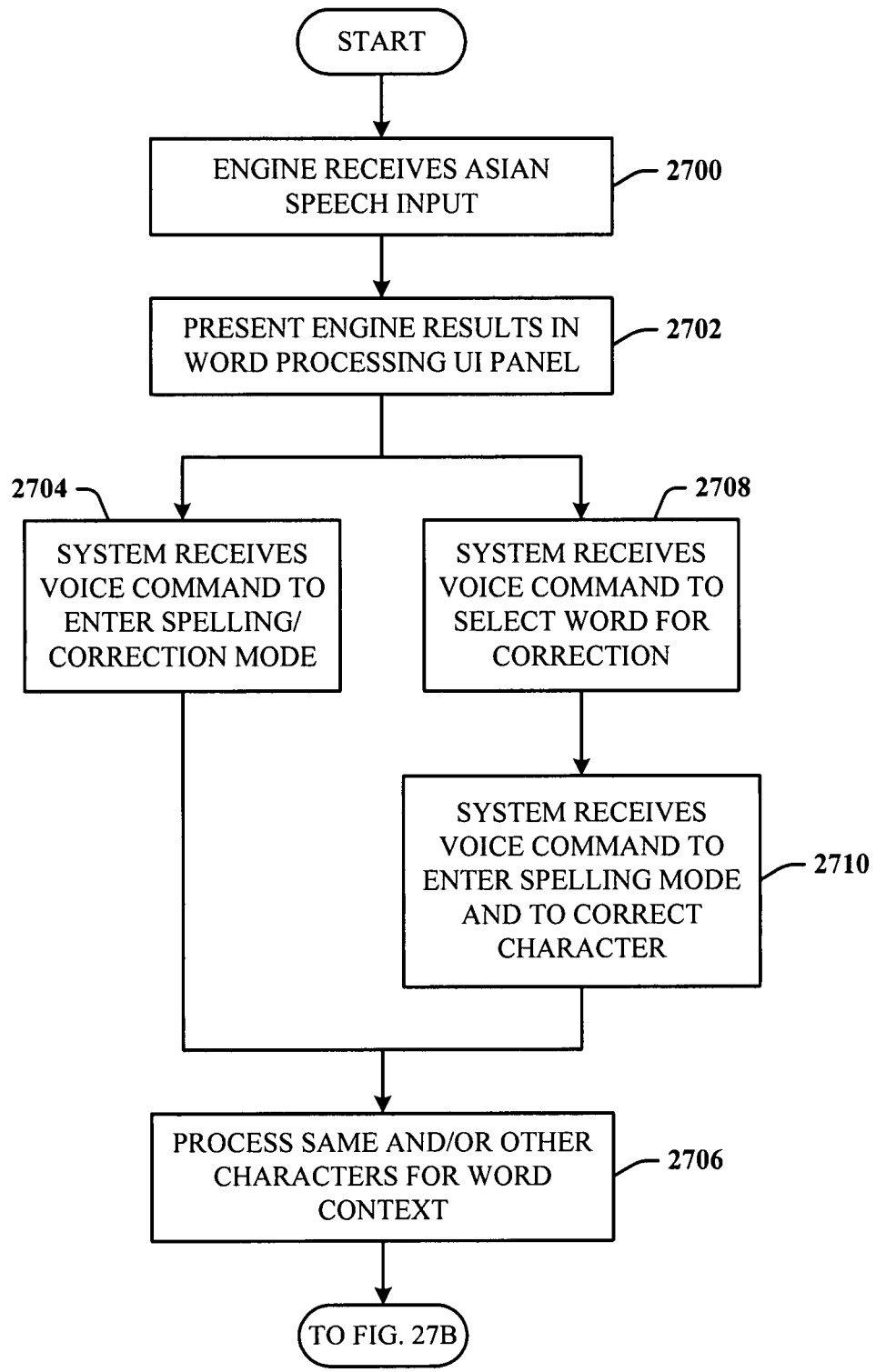
FIGS. 27A and 27B illustrate a method of correction processing based on multiple methods for spelling correction.
Figure 27B:
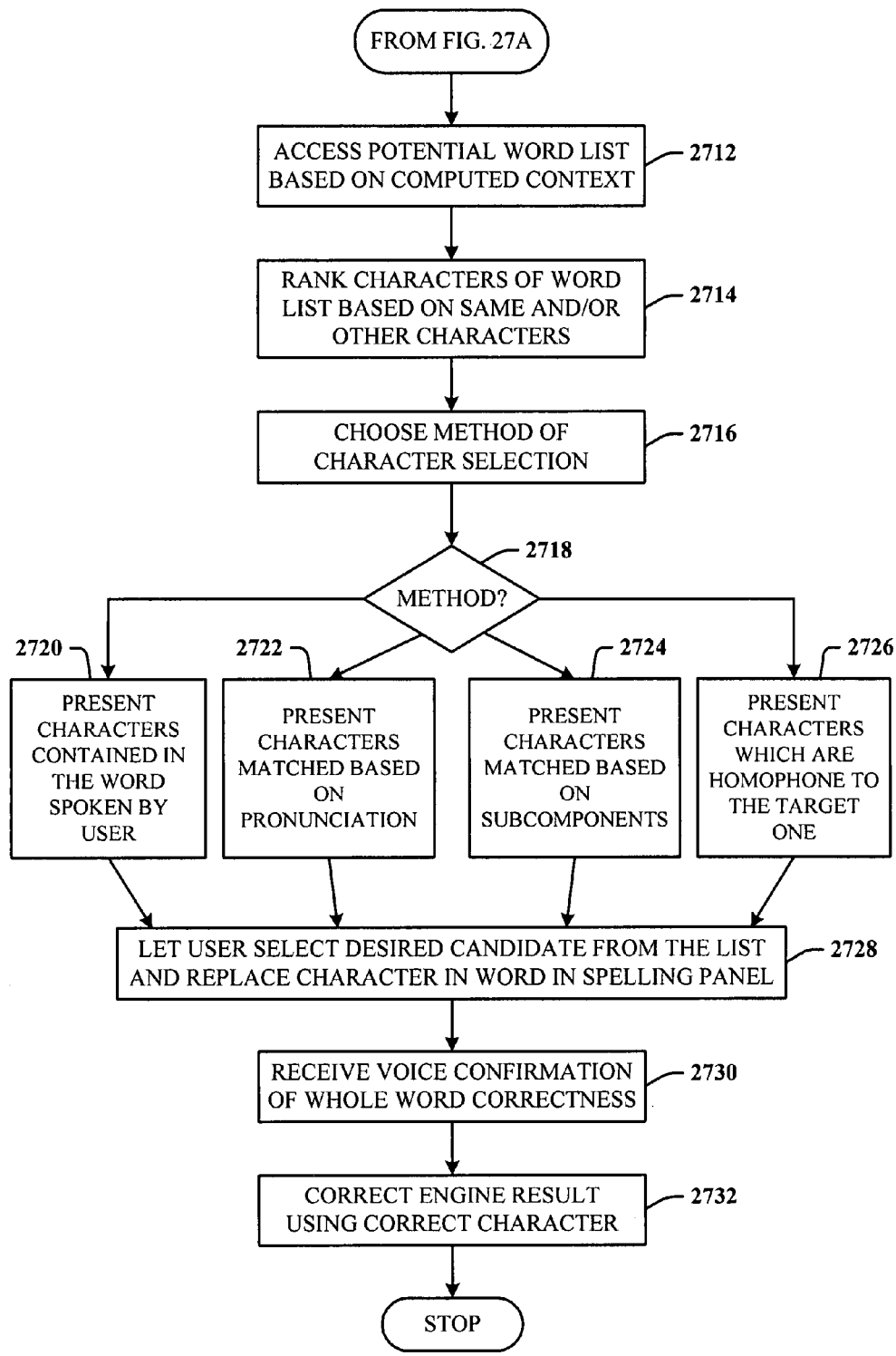

FIGS. 27A and 27B illustrate a method of correction processing based on multiple methods for spelling correction. At 2700, the engine receives Asian speech input. At 2702, the recognized engine results are present in the UI. At 2704, the system receives a voice command to enter the spelling/correction mode (to enter new words directly). Flow is then to 2706 where the same and/or other characters are processed for word context. Alternatively, flow can be from 2702 to 2708 where the system receives a voice command to select a word for correction. At 2710, the system receives a voice command to enter the spelling mode and to select and correct a character. As before, flow is then to 2706 where the same and/or other characters are processed for word context.

Moving to FIG. 27B, at 2712, a potential word list is accessed based on computed context. For example, the context can be personal names. At 2714, characters of the word list are ranked based on same and/or other characters. At 2716, the method of character selection is chosen. At 2718, flow can be to 2720, where a method is selected to voice a word that contains a character in similar usage. Alternatively, at 2722, a method is selected to obtain character by providing pronunciation of the desired character. Still alternatively, at 2724, a method is selected where a word is voiced to obtain the character by subcomponents. Alternatively, at 2726, a method is selected to voice word(s) to obtain a homophone list, and select from the homophone list. At 2728, the new character is added or the incorrect character in the misspelled word is then replaced by the selected character. At 2730, voice confirmation is then received from the user of whole word correctness. At 2732, the engine result is then corrected using the correct character.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 28:
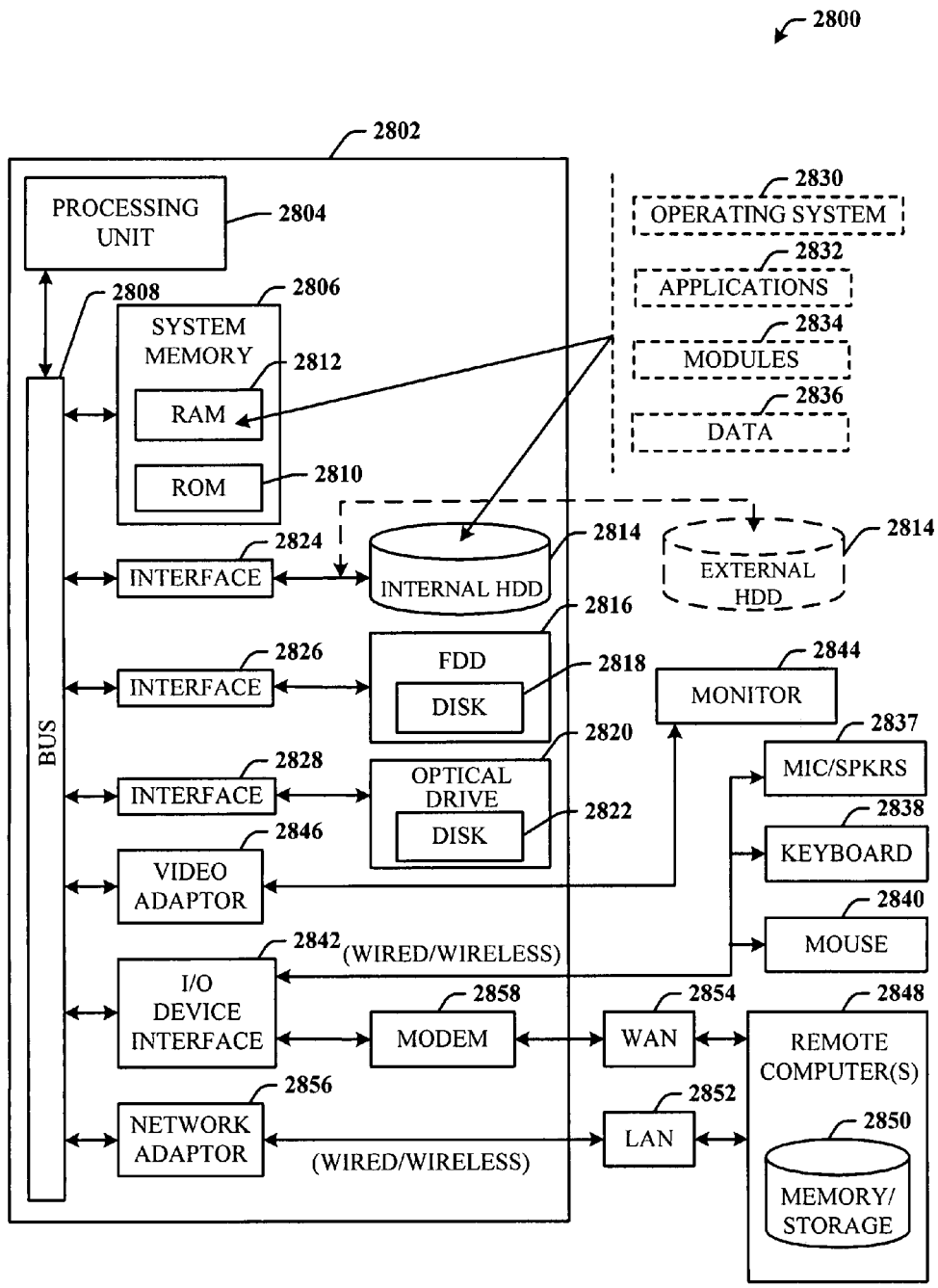
FIG. 28 illustrates a block diagram of a computing system operable to execute correction processing in accordance with the disclosed architecture.

Referring now to FIG. 28, there is illustrated a block diagram of a computing system 2800 operable to execute correction processing in accordance with the disclosed architecture. In order to provide additional context for various aspects thereof, FIG. 28 and the following discussion are intended to provide a brief, general description of a suitable computing system 2800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 28, the exemplary computing system 2800 for implementing various aspects includes a computer 2802, the computer 2802 including a processing unit 2804, a system memory 2806 and a system bus 2808. The system bus 2808 provides an interface for system components including, but not limited to, the system memory 2806 to the processing unit 2804. The processing unit 2804 can be any of various commercially available processors. Dual microprocessors and other multi-processor architectures may also be employed as the processing unit 2804.

The system bus 2808 can be any of several types of bus structure that may further interconnect to a memory bus (with or without a memory controller), a peripheral bus, and a local bus using any of a variety of commercially available bus architectures. The system memory 2806 includes read-only memory (ROM) 2810 and random access memory (RAM) 2812. A basic input/output system (BIOS) is stored in a non-volatile memory 2810 such as ROM, EPROM, EEPROM, which BIOS contains the basic routines that help to transfer information between elements within the computer 2802, such as during start-up. The RAM 2812 can also include a high-speed RAM such as static RAM for caching data.

The computer 2802 further includes an internal hard disk drive (HDD) 2814 (e.g., EIDE, SATA), which internal hard disk drive 2814 may also be configured for external use in a suitable chassis (not shown), a magnetic floppy disk drive (FDD) 2816, (e.g., to read from or write to a removable diskette 2818) and an optical disk drive 2820, (e.g., reading a CD-ROM disk 2822 or, to read from or write to other high capacity optical media such as the DVD). The hard disk drive 2814, magnetic disk drive 2816 and optical disk drive 2820 can be connected to the system bus 2808 by a hard disk drive interface 2824, a magnetic disk drive interface 2826 and an optical drive interface 2828, respectively. The interface 2824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 2802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 2812, including an operating system 2830, one or more application programs 2832, other program modules 2834 and program data 2836. All or portions of the operating system, applications, modules, and/or data can also be cached in the RAM 2812. It is to be appreciated that the disclosed architecture can be implemented with various commercially available operating systems or combinations of operating systems.

A user can enter commands and information into the computer 2802 through one or more wire/wireless input devices, for example, a keyboard 2838 and a pointing device, such as a mouse 2840. Input/output devices can include a microphone/speakers 2837, and other device (not shown), for example, an IR remote control, a joystick, a game pad, a stylus pen, touch screen, or the like. These and other input devices are often connected to the processing unit 2804 through an input device interface 2842 that is coupled to the system bus 2808, but can be connected by other interfaces, such as a parallel port, an IEEE 1394 serial port, a game port, a USB port, an IR interface, etc.

A monitor 2844 or other type of display device is also connected to the system bus 2808 via an interface, such as a video adapter 2846. In addition to the monitor 2844, a computer typically includes other peripheral output devices (not shown), such as speakers, printers, etc.

The computer 2802 may operate in a networked environment using logical connections via wire and/or wireless communications to one or more remote computers, such as a remote computer(s) 2848. The remote computer(s) 2848 can be a workstation, a server computer, a router, a personal computer, portable computer, microprocessor-based entertainment appliance, a peer device or other common network node, and typically includes many or all of the elements described relative to the computer 2802, although, for purposes of brevity, only a memory/storage device 2850 is illustrated. The logical connections depicted include wire/wireless connectivity to a local area network (LAN) 2852 and/or larger networks, for example, a wide area network (WAN) 2854. Such LAN and WAN networking environments are commonplace in offices and companies, and facilitate enterprise-wide computer networks, such as intranets, all of which may connect to a global communications network, for example, the Internet.

When used in a LAN networking environment, the computer 2802 is connected to the local network 2852 through a wire and/or wireless communication network interface or adapter 2856. The adaptor 2856 may facilitate wire or wireless communication to the LAN 2852, which may also include a wireless access point disposed thereon for communicating with the wireless adaptor 2856.

When used in a WAN networking environment, the computer 2802 can include a modem 2858, or is connected to a communications server on the WAN 2854, or has other means for establishing communications over the WAN 2854, such as by way of the Internet. The modem 2858, which can be internal or external and a wire and/or wireless device, is connected to the system bus 2808 via the serial port interface 2842. In a networked environment, program modules depicted relative to the computer 2802, or portions thereof, can be stored in the remote memory/storage device 2850. It will be appreciated that the network connections shown are exemplary and other means of establishing a communications link between the computers can be used.

The computer 2802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 29:
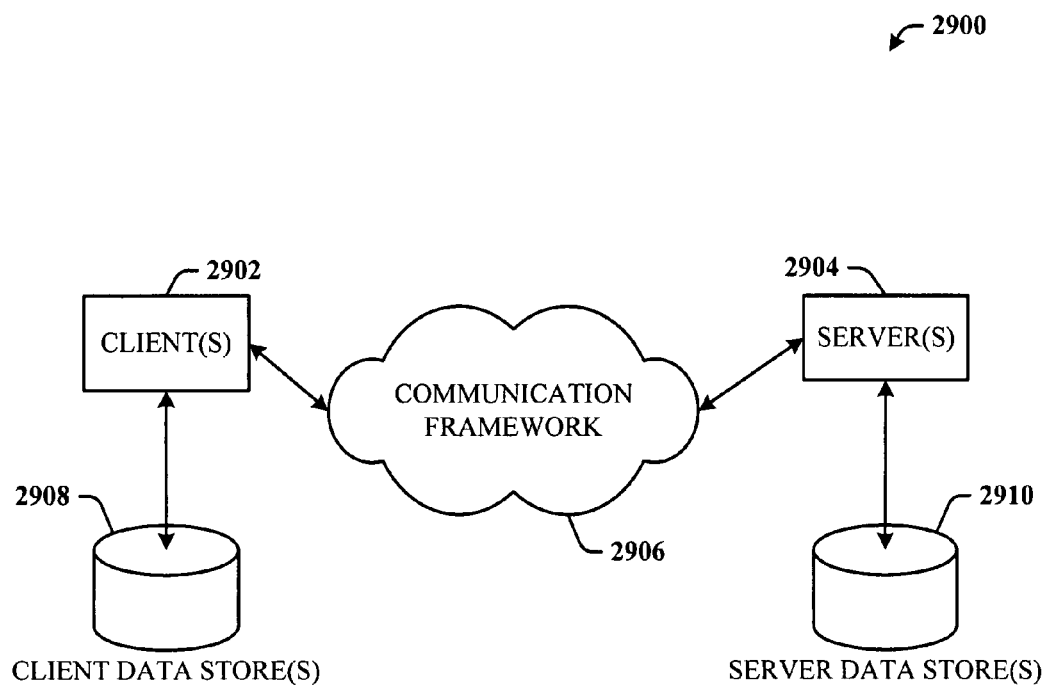
FIG. 29 illustrates a schematic block diagram of an exemplary computing environment for correction processing in accordance with the disclosed architecture.

Referring now to FIG. 29, there is illustrated a schematic block diagram of an exemplary computing environment 2900 for correction processing in accordance with the disclosed architecture. The system 2900 includes one or more client(s) 2902. The client(s) 2902 can be hardware and/or software (e.g., threads, processes, computing devices). The client(s) 2902 can house cookie(s) and/or associated contextual information, for example.

The system 2900 also includes one or more server(s) 2904. The server(s) 2904 can also be hardware and/or software (e.g., threads, processes, computing devices). The servers 2904 can house threads to perform transformations by employing the architecture, for example. One possible communication between a client 2902 and a server 2904 can be in the form of a data packet adapted to be transmitted between two or more computer processes. The data packet may include a cookie and/or associated contextual information, for example. The system 2900 includes a communication framework 2906 (e.g., a global communication network such as the Internet) that can be employed to facilitate communications between the client(s) 2902 and the server(s) 2904.

Communications can be facilitated via a wire (including optical fiber) and/or wireless technology. The client(s) 2902 are operatively connected to one or more client data store(s) 2908 that can be employed to store information local to the client(s) 2902 (e.g., cookie(s) and/or associated contextual information). Similarly, the server(s) 2904 are operatively connected to one or more server data store(s) 2910 that can be employed to store information local to the servers 2904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented translation system, comprising:
    a speech recognition component for execution by a processor for outputting an Asian character based on speech input, the speech recognition component operable to switch between multiple writing systems based on a language of the speech input; and
    a correction component for:
        receiving a user selection of a correction method of one of: a pronunciation method, a character-in-word method, and a character decomposition method to correct an incorrect recognition result; and
        generating a corrected output in a single pass using the selected correction method based on an incorrect output by the speech recognition component, wherein the pronunciation method includes a spelling wizard to present one or more dialog panels to facilitate user interaction vocally and manually for selecting and correcting the incorrect output, the one or more dialog panels presented in response to a voice activated command; wherein the character-in-word method receives information related to how a word is written by from a user voicing words in which the character is used; and wherein the character decomposition method receives information related to the constituent part with which the character is composed from a user voicing a word to obtain the character by subcomponents.

2. The system of claim 1, wherein the pronunciation method receives information related to word pronunciation using local phonetic symbols.

3. The system of claim 1, further comprising an inference component that employs a probabilistic and/or statistical-based analysis to prognose or infer an action that is desired to be automatically performed.

4. The system of claim 1, further comprising a sharing component for sharing updated lexicon with other users and lexicon vendors.

5. The system of claim 1, further comprising a weighting component for weighting words based on meaning.

6. The system of claim 1, further comprising a frequency component for storing frequency of usage information, the correction component using the frequency of usage information to provide a ranked list of candidate characters.

7. The system of claim 1, wherein the Asian character is of a Chinese or Japanese form of writing that includes a pictograph having an associated fixed pronunciation.

8. A computer-implemented method of recognizing speech, comprising:
- recognizing by a processor Asian voice signals to output a result;
- switching between multiple writing systems based on a language of the Asian voice signals;
- receiving a user selection of a correction method of one of: a pronunciation method, a character-in-word method, and a character decomposition method to a user to correct an incorrect recognition result;
- entering a spelling/correction mode to correct spelling of the result using the selected correction method, wherein the pronunciation method includes a spelling wizard to present one or more dialog panels to facilitate user interaction vocally and manually for selecting and correcting the result, the one or more dialog panels presented in response to a voice activated command, wherein the character-in-word method receives information related to how a word is written from a user voicing words in which the character is used, and wherein the character decomposition method receives information related to the constituent part with which the character is composed from a user voicing a word to obtain the character by subcomponents; and
- correcting the spelling of the result in a single pass based on the selected method.

9. The method of claim 8, further comprising automatically entering the spelling/correction mode in response to receiving the Asian voice signals, wherein the spelling wizard receives a phonetic pronunciation.

10. The method of claim 8, further comprising applying a confusion matrix that stores phoneme distances used to correct the spelling.

11. The method of claim 8, further comprising correcting the spelling using a voiced homophone command.

12. The method of claim 8, further comprising correcting the spelling based on word decomposition into symbol subcomponents.

13. The method of claim 8, further comprising developing a new lexicon while correcting the spelling and transmitting the new lexicon to another user.

14. The method of claim 8, further comprising selecting the character based on voice input of one or more words that contain the character.

15. The method of claim 8, further comprising generating a prioritized list of candidate characters and presenting the candidate characters as an indexed list for selection one of manually or by voice command.

16. A computer-implemented system, comprising:
- computer-implemented means for recognizing Asian voice signals to output a result;
- computer-implemented means for switching between multiple writing systems based on a language of the Asian voice signals;
- computer-implemented means for receiving a user selection of a correction method of one of: a pronunciation method, a character-in-word method, and a character decomposition method to a user, to correct an incorrect recognition result;
- computer-implemented means for entering a spelling/correction mode to correct spelling of the result according to the selection, wherein the pronunciation method includes a spelling wizard to present one or more dialog panels to facilitate user interaction vocally and manually for selecting and correcting the result, the one or more dialog panels presented in response to a voice activated command, wherein the character-in-word method receives information related to how a word is written from a user voicing words in which the character is used, and wherein the character decomposition method receives information related to the constituent part with which the character is composed from a user voicing a word to obtain the character by subcomponents;
- computer-implemented means for performing a key word search; and
- computer-implemented means for correcting the spelling of the result in a single pass based on the selected method.

* * * * *